US012655335B2

(12) United States Patent
Morita

(10) Patent No.: US 12,655,335 B2
(45) Date of Patent: Jun. 16, 2026

(54) SEALANT SHEET

(71) Applicant: NITTO DENKO CORPORATION, Ibaraki (JP)

(72) Inventor: Kosuke Morita, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 782 days.

(21) Appl. No.: 17/254,973

(22) PCT Filed: Jun. 26, 2019

(86) PCT No.: PCT/JP2019/025445
§ 371 (c)(1),
(2) Date: Dec. 22, 2020

(87) PCT Pub. No.: WO2020/004487
PCT Pub. Date: Jan. 2, 2020

(65) Prior Publication Data
US 2021/0122956 A1 Apr. 29, 2021

(30) Foreign Application Priority Data

Jun. 26, 2018 (JP) ................................. 2018-120612

(51) Int. Cl.
*C09J 181/04* (2006.01)
*C08K 3/013* (2018.01)
(Continued)

(52) U.S. Cl.
CPC ............. *C09J 181/04* (2013.01); *C08K 3/013* (2018.01); *C08K 3/346* (2013.01); *C08K 3/40* (2013.01); *C08K 5/0025* (2013.01); *C08K 5/37* (2013.01); *C08L 63/00* (2013.01); *C08L 81/04* (2013.01); *C09J 7/40* (2018.01); *C09J 163/00* (2013.01);
(Continued)

(58) Field of Classification Search
None
See application file for complete search history.

(56) References Cited

U.S. PATENT DOCUMENTS 3,476,826 A 11/1969 Millen
4,267,307 A 5/1981 Louthan et al.
(Continued)

FOREIGN PATENT DOCUMENTS

CN 105339340 A 2/2016
CN 106414461 A 2/2017
(Continued)

OTHER PUBLICATIONS

Thioplast EPS 25 product data sheet (Year: 2014).*
(Continued)

*Primary Examiner* — Frank D Ducheneaux
(74) *Attorney, Agent, or Firm* — Sughrue Mion, PLLC

(57) ABSTRACT

Provided is a sealant sheet formed in a sheet shape. The sealant sheet comprises an epoxy group-containing polysulfide polymer (AB) having two or more epoxy groups per molecule, a thiol compound (C) having two or more thiol groups per molecule, and a photobase generator (D); or a thiol group-containing polysulfide polymer (AC) having two or more thiol groups per molecule, an epoxy compound (B) having two or more epoxy groups per molecule, and a photobase generator (D).

8 Claims, 1 Drawing Sheet

(51) Int. Cl.

| | | |
|---|---|---|
| *C08K 3/34* | (2006.01) | |
| *C08K 3/40* | (2006.01) | |
| *C08K 5/00* | (2006.01) | |
| *C08K 5/37* | (2006.01) | |
| *C08L 63/00* | (2006.01) | |
| *C08L 81/04* | (2006.01) | |
| *C09J 7/40* | (2018.01) | |
| *C09J 163/00* | (2006.01) | |
| *C09K 3/10* | (2006.01) | |
| *C08K 3/26* | (2006.01) | |
| *C08K 3/36* | (2006.01) | |

(52) U.S. Cl.
CPC ...... *C09K 3/1012* (2013.01); *C08K 2003/265* (2013.01); *C08K 3/36* (2013.01); *C08L 2203/162* (2013.01); *C09J 2301/312* (2020.08); *C09J 2301/408* (2020.08); *C09J 2463/00* (2013.01); *C09J 2481/00* (2013.01)

(56) References Cited

U.S. PATENT DOCUMENTS

| | | | | |
|---|---|---|---|---|
| 5,464,225 A | | 11/1995 | Uematsu et al. | |
| 5,663,219 A | | 9/1997 | Chokshi et al. | |
| 6,284,360 B1 | * | 9/2001 | Johnson | B32B 27/40 |
| | | | | 428/317.1 |
| 6,353,066 B1 | * | 3/2002 | Sosa | C08F 12/04 |
| | | | | 526/347 |
| 6,596,200 B1 | | 7/2003 | Ogawa et al. | |
| 2003/0050511 A1 | | 3/2003 | Gilmore et al. | |
| 2011/0001419 A1 | * | 1/2011 | Takamatsu | C08G 59/4064 |
| | | | | 313/317 |
| 2013/0130038 A1 | | 5/2013 | Woudsma | |
| 2014/0010983 A1 | | 1/2014 | Gorodisher | |
| 2014/0336340 A1 | | 11/2014 | Suga et al. | |
| 2015/0065599 A1 | | 3/2015 | Kralev et al. | |
| 2016/0122292 A1 | | 5/2016 | Sakai et al. | |
| 2016/0340374 A1 | * | 11/2016 | Sakai | C07C 279/26 |
| 2018/0030322 A1 | | 2/2018 | Bons et al. | |
| 2018/0127538 A1 | * | 5/2018 | Ye | C08G 75/02 |
| 2018/0194979 A1 | | 7/2018 | Cui et al. | |
| 2019/0002403 A1 | | 1/2019 | Yanaba et al. | |
| 2019/0031931 A1 | | 1/2019 | Kitayama et al. | |
| 2019/0256751 A1 | * | 8/2019 | Townsend | C08K 5/17 |
| 2019/0359561 A1 | | 11/2019 | Sakai et al. | |
| 2020/0291184 A1 | | 9/2020 | Morita et al. | |

FOREIGN PATENT DOCUMENTS

| | | | |
|---|---|---|---|
| CN | 107848963 A | 3/2018 | |
| JP | 04-320478 A | 11/1992 | |
| JP | 08-195190 A | 7/1996 | |
| JP | 8-217854 A | 8/1996 | |
| JP | 2001-522910 A | 11/2001 | |
| JP | 2001-335689 A | 12/2001 | |
| JP | 3442860 B2 | 9/2003 | |
| JP | 2006-526693 A | 11/2006 | |
| JP | 2008-530270 A | 8/2008 | |
| JP | 4227787 B2 | 2/2009 | |
| JP | 2012-131936 A | 7/2012 | |
| JP | 2013-119519 A | 6/2013 | |
| JP | 2014-532801 A | 12/2014 | |
| JP | 2017-145276 A | 8/2017 | |
| WO | 99/24491 A1 | 5/1999 | |
| WO | 02/051905 A1 | 7/2002 | |
| WO | 2005/000965 A1 | 1/2005 | |
| WO | 2006/086211 A1 | 8/2006 | |
| WO | 2013/067963 A1 | 5/2013 | |
| WO | 2013/089000 A1 | 6/2013 | |
| WO | 2018/085190 A1 | 5/2018 | |
| WO | WO-2018112130 A1 * | 6/2018 | ............ C08G 75/00 |
| WO | 2019/107486 A1 | 6/2019 | |

OTHER PUBLICATIONS

Notification of First Office Action dated Feb. 8, 2023 issued in Chinese Application No. 201980043245.3.
Extended European Search Report dated Jun. 9, 2022, issued in European Application No. 19826083.8.
International Search Report of PCT/JP2019/025445 dated Oct. 1, 2019 [PCT/ISA/210].
Notification of First Office Action dated Feb. 10, 2023 in Chinese Application No. 201980043243.4.
Communication dated Jan. 31, 2023 from EPO in European Application No. 19827579.4.
Extended European Search Report dated Jun. 30, 2021 in European Application No. 18882496.5.
Extended European Search Report dated Mar. 21, 2022 in European Application No. 19827579.4.
First Office Action dated Oct. 10, 2022 from the China National Intellectual Property Office in CN Application No. 201880077128.4.
International Search Report of PCT/JP2018/043951 dated Feb. 19, 2019 [PCT/ISA/210].
International Search Report of PCT/JP2019/025446 dated Oct. 1, 2019 [PCT/ISA/210].
Final Office Action dated Mar. 21, 2023 from the United States Patent and Trademark Office in U.S. Appl. No. 16/767,844.
Notice of Reasons for Refusal dated Oct. 13, 2022 from the Japanese Patent Office in JP Application No. 2019-557318.
Non-Final Office Action dated Jul. 8, 2022 from the United States Patent and Trademark Office in U.S. Appl. No. 16/767,844.
Non-Final Office Action dated Aug. 16, 2023 from the United States Patent and Trademark Office in U.S. Appl. No. 17/254,951.
Notification of Second Office Action dated Jul. 10, 2023 in Chinese Application No. 201980043245.3.
Chinese Office Action dated Jul. 10, 2023 in Application No. 201980043243.4.
Communication issued Dec. 18, 2023 in European Application No. 19 826 083.8.

* cited by examiner

100

200

SEALANT SHEET

CROSS REFERENCE TO RELATED APPLICATIONS

This application is a National Stage of International Application No. PCT/JP2019/025445, filed Jun. 26, 2019, claiming priority to Japanese Patent Application No. 2018-120612, filed Jun. 26, 2018, the contents of all of which are incorporated herein by reference in their entirety.

TECHNICAL FIELD

The present invention relates to a sealant in a sheet shape, that is, a sealant sheet.

BACKGROUND ART

Liquid polysulfide polymer includes —S—S— bonds in the molecule; and therefore, when allowed to cure, it can form a rubbery cured material having excellent resistance to oil such as jet fuel and hydraulic oil (oil resistance). Accordingly, liquid polysulfide polymer is used as a sealant material for aircrafts, for example. Technical documents on liquid polysulfide polymer include Patent Documents 1 to 3. Patent Documents 4 and 5 relate to aircraft sealants and aerospace sealants, but not to a polysulfide-based sealant. Patent Document 6 is a technical document on a polysulfide-based pressure-sensitive adhesive tape.

CITATION LIST

Patent Literature

[Patent Document 1] Japanese Patent No. 4227787
[Patent Document 2] Japanese Patent No. 3442860
[Patent Document 3] Japanese Patent Application Publication No. 2013-119519
[Patent Document 4] Japanese Patent Application Publication (Translation of PCT Application) No. 2006-526693
[Patent Document 5] Japanese Patent Application Publication (Translation of PCT Application) No. 2008-530270
[Patent Document 6] Japanese Patent Application Publication No. 2017-145276

SUMMARY OF INVENTION

Technical Problem

A sealant using liquid polysulfide polymer is put on by mixing liquid A containing liquid polysulfide polymer and liquid B containing a curing agent for the polysulfide polymer immediately before the application to prepare a liquid sealant, applying the liquid sealant to a target object and allowing it to cure on the target object. As the curing agent, strong oxidizing agents such as dichromic acid are often used as they can allow the curing reaction to readily proceed at room temperature.

With such a liquid sealant, however, because it is in a liquid form, it is difficult to achieve a precise application of a desired thickness in a desired area of the target object. Thus, even for a skilled worker, there is a limit to reducing the time required for application of liquid sealant. There are also concerns about increased manufacturing costs, decreased productivity and degraded sealing quality, arising from difficulties in training and securing workers.

In view of such circumstances, an objective of this invention is to facilitate application of a polysulfide-based sealant.

Solution to Problem

To achieve the objective, this description provides a sealant sheet formed in a sheet shape. The sealant sheet is pre-formed in a sheet shape; and therefore, it is easy to handle and can be easily placed in a desired location.

In an embodiment, the sealant sheet disclosed herein comprises an epoxy group-containing polysulfide polymer (AB) having two or more epoxy groups per molecule, a thiol compound (C) having two or more thiol groups per molecule, and a photobase generator (D). Hereinafter, a sealant sheet in this embodiment may be referred to as a type (I) sealant sheet.

In another embodiment, the sealant sheet disclosed herein comprises a thiol group-containing polysulfide polymer (AC) having two or more thiol groups per molecule, an epoxy compound (B) having two or more epoxy groups per molecule, and a photobase generator (D). Hereinafter, a sealant sheet in this embodiment may be referred to as a type (II) sealant sheet.

By the anionic addition reaction between the epoxy group and the thiol group, sealant sheets of both type (I) and type (II) can be cured to increase the strength (e.g. strength at break) while placed in desired areas. The cured sealant thus formed (cured product of the sealant sheet) may show excellent oil resistance clue to the polysufide structure. Because the thickness of the cured material can be controlled with the thickness of the sealant sheet being used, its application does not require adjustment of coating thickness as in application of a liquid sealant. Thus, according to the sealant sheet, a polysulfide-based sealant can be easily applied with precision. In addition, the sealant sheet is configured to generate a base from the photobase generator (D) by photoirradiation, thereby accelerating the addition reaction; and therefore, it can keep well when stored in an environment that suppresses base generation from the photobase generator (D). As the photobase generator (D), for instance, a biguanide-based ionic photobase generator (a compound comprising a biguanidic cation) can be preferably used. According to such a photobase generator (D), the resulting sealant sheet can favorably combine good storage properties before use and good curing properties (anionic photocuring properties) upon use, with these well-balanced.

As the thiol compound (C), in view of the balance between the storage properties before use and the curing properties upon use, it is preferable to use a species having a thiol equivalence of 45 g/eq or higher and 450 g/eq or lower.

As the epoxy compound (B), in view of the balance between the storage properties before use and the curing properties upon use, it is preferable to use a species having an epoxy equivalence of 50 g/eq or higher and 600 g/eq or lower.

The sealant sheet disclosed herein can comprise a filler. The use of filler may improve either or both of the strength and the stretchiness of the cured sealant.

The sealant sheet preferably has a storage modulus of 0.005 MPa or greater and 0.8 MPa or less at 25° C. With the sealant sheet having a storage modulus in this range, a suitable balance can be easily achieved between tightness of adhesion to the target object and retention stability of the sheet shape.

The sealant sheet prior to use (i.e. before placed in a desired area) may be in a form of release-lined sealant sheet comprising the sealant sheet and a release liner having a release face in contact with at least one face of the sealant sheet. The sealant sheet in such an embodiment is preferable from the standpoint of its preservability and ease of handling during its transportation, processing, placement in a desired area, etc.

The present description also provides a cured sealant, which is a cured material of a polysulfide-based sealant. The cured material comprises a disulfide structure, a structure formed by an anion addition reaction between epoxy and thiol groups, and a biguanidic compound derived from a photobase generator. Such a cured sealant is preferable because it can be formed by accelerating the anion addition reaction between epoxy and thiol groups by means of the base (biguanide compound, here) generated from the photobase generator.

The scope of the invention for which the present patent application seeks patent protection may include a suitable combination of the features described above.

DESCRIPTION OF EMBODIMENTS

Figure 1:
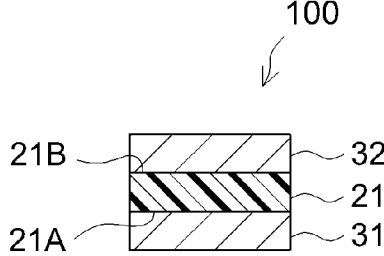
FIG. 1 shows a cross-sectional diagram schematically illustrating a constitutional example of the sealant sheet.

Preferred embodiments of the present invention are described below. Matters necessary to practice this invention other than those specifically referred to in this description can be understood by a person skilled in the art based on the disclosure about implementing the invention in this description and common general knowledge at the time of application. The present invention can be practiced based on the contents disclosed in this description and common technical knowledge in the subject field. In the drawings referenced below, a common reference numeral may be assigned to members or sites producing the same effects, and duplicated descriptions are sometimes omitted or simplified. The embodiments described in the drawings are schematized for clear illustration of the present invention, and do not necessarily represent accurate sizes or reduction scales of the product actually provided.

<Sealant Sheet>

The sealant sheet disclosed herein is pre-formed in a sheet shape and can be placed in an area to be sealed with it in the sheet form. In this aspect, the sealant sheet is clearly distinct from a liquid sealant (e.g. a liquid sealant prepared by mixing liquid A containing a liquid polysulfide polymer and liquid B containing a curing agent for the polysulfide polymer immediately before application) applied in a liquid form to an area to be sealed. The sealant sheet disclosed herein can be cured by taking advantage of the addition reaction between the epoxy group and the thiol group. In terms of having such curing properties, the sealant sheet disclosed herein is clearly distinct from the sealant after cured (cured sealant). The sealant sheet disclosed herein can be thought as a semi-cured sealant sheet which can be further cured after placed in an area to be sealed.

Figure 2:
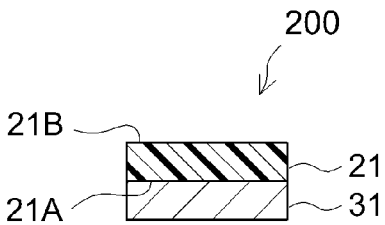
FIG. 2 shows a cross-sectional diagram schematically illustrating another constitutional example of the sealant sheet.

FIGS. 1 and 2 show constitutional examples of the sealant sheet disclosed herein.

In a sealant sheet 21 shown in FIG. 1, one face (first face) 21A and the other face (second face) 21B thereof are protected, respectively, with release liners 31 and 32 each having a release face at least on the sealant sheet 21 side. Sealant sheet 21 in such an embodiment can be thought as a component of a release-lined sealant sheet 100 comprising sealant sheet 21, release liners 31 and 32.

Sealant sheet 21 shown in FIG. 2 has a constitution where one face 21A thereof is protected with release liner 31 having a release face on each side so that, when it is wound, the other face 21B of sealant sheet 21 is brought in contact with and protected also with release liner 31. Sealant sheet 21 in such an embodiment can be thought as a component of a release-lined sealant sheet 200 comprising sealant sheet 21 and release liner 31.

The sealant sheet disclosed herein preferably has shape-holding properties that enable stable retention of the sheet shape at room temperature (e.g. about 25° C.). The shape-holding properties can also be thought as resistance to plastic deformation such as creep deformation. The sealant sheet can have a storage modulus at 25° C. (or simply a "storage modulus" hereinafter) of, for instance, greater than 0.005 MPa, or preferably greater than 0.01 MPa. With increasing storage modulus of the sealant sheet, the handling properties and ease of processing (e.g. ease of cutting, anti-blocking properties, re-workability) of the sealant sheet tend to increase. In some embodiments, the storage modulus of the sealant sheet can be, for instance, 0.05 MPa or greater, 0.1 MPa or greater, or even 0.2 MPa or greater. The maximum storage modulus is not particularly limited. In some embodiments, the storage modulus of the sealant sheet can be, for instance, 2 MPa or less, 1 MPa or less, 0.8 MPa or less, 0.6 MPa or less, 0.5 MPa or less, 0.4 MPa or less, or even 0.3 MPa or less. With decreasing storage modulus of the sealant sheet, the conformability to surface contours in areas to be sealed tends to increase.

The storage modulus is determined at a frequency of 1 Hz at 0.5% strain, using a rheometer. As the rheometer, model name ARES G2 available from TA Instruments Japan, Inc. or a comparable system can be used. More specifically, the storage modulus is determined by the method described later in Examples.

As used herein, the storage modulus of the sealant sheet means the storage modulus of the uncured sealant sheet unless otherwise noted and is distinguished from the storage modulus of the cured sealant sheet (cured sealant). As used herein, the storage modulus of the sealant sheet typically means the storage modulus of the sealant sheet prior to use, that is, prior to placement by adhesion, etc., in the area to be sealed.

The thickness of the sealant sheet is not particularly limited and can be selected in accordance with the thickness of the cured sealant to be obtained. From the standpoint of the sealing reliability, etc., in some embodiments, the sealant sheet may have a thickness of, for instance, 0.01 mm or greater, 0.03 mm or greater, 0.05 mm or greater, 0.1 mm or greater, or even 0.15 mm or greater. The sealant sheet disclosed herein can also be made in an embodiment where the thickness is, for instance, greater than 0.3 mm, greater than 0.5 mm, greater than 1 mm, or even greater than 1.5 mm. In some embodiments, the sealant sheet may have a thickness of, for instance, 10 mm or less, 5 mm or less, 3 mm or less, 2 mm or less, 1 mm or less, 0.5 mm or less, or even 0.3 mm or less. With decreasing thickness of the sealant sheet, the photo-curing properties tend to improve. It may be advantageous to reduce the thickness of the sealant sheet from the standpoint of the conformability to surface contours in the area to be sealed, weight reduction, etc.

<Polysulfide Polymer (A)>

The sealant sheet disclosed herein comprises a polysulfide polymer (A). The polysulfide polymer (A) have a repeat unit that includes a disulfide structure represented by —S—S— and contributes to greater oil resistance of the cured material formed from the sealant sheet. The type (I) sealant sheet disclosed herein comprises the epoxy group-containing polysulfide polymer (AB) as the polysulfide polymer (A). The type (II) sealant sheet disclosed herein comprises the thiol group-containing polysulfide polymer (AC) as the polysulfide polymer (A).

One molecule of polysulfide polymer (A) may include one, two or more disulfides. From the standpoint of the oil resistance of the cured material, it is preferable to use a polysulfide polymer (A) having an average of three or more disulfide structures per molecule. The average number of disulfide structures per molecule of polysulfide polymer (A) (or the average disulfide group count, hereinafter) can be, for instance, 5 or greater, 10 or greater, 15 or greater, or even 20 or greater. The upper limit of the average disulfide group count is not particularly limited. From the standpoint of the ease of manufacturing the sealant sheet (e.g. the ease of molding into a sheet shape), etc., it can be, for instance, 100 or less, 70 or less, or even 50 or less.

The disulfide structure is preferably in the main chain of polysulfide polymer (A). When the main chain includes the disulfide structure, the resulting cured material tends to show good stretchiness.

In some embodiments, the polysulfide polymer (A) preferably includes a repeat unit represented by the next general formula (1):

$$—R^1—O—R^2—O—R^3—S—S— \qquad (1)$$

Here, $R^1$, $R^2$ and $R^3$ in the general formula (1) are independently an alkylene group with 1 to 4 carbon atoms, preferably an alkylene group with 1 to 3 carbon atoms, or more preferably an alkylene group with 1 or 2 carbon atoms. The repeat unit (1) has a structure in which an ether structure is connected to a disulfide structure. With a polysulfide polymer (A) having such a repeat unit (1), the resulting cured material tends to have excellent oil resistance and flexibility. The average number of repeat units (1) per molecule of polysulfide polymer (A) can be, for instance, 5 or greater, 10 or greater, 15 or greater, or 20 or greater. The average number can be, for instance, 100 or less, 70 or less, or even 50 or less. The polysulfide polymer (A) may have, per molecule, solely one region with successive repeat units (1), or two or more such regions.

In some embodiments, the polysulfide polymer (A) may include at least one among structures represented by the following general formulas (2a) and (2b):

$$—CH_2—S—CH_2CHOH—R' \qquad (2a)$$

$$—CH_2—S—CH(CH_2OH)—R' \qquad (2b)$$

Here, R' in the general formulas (2a) and (2b) is an organic group having at least one (e.g. about 1 to 5) epoxy group(s). The structures of the general formulas (2a) and (2b) can be formed, for instance, by addition reaction between a thiol having a structural moiety represented by —CH₂—SH and an epoxy compound having a substituent group R' on the epoxy ring. The number of structural units represented by the general formula (2a) or (2b) (the total number when both a structure represented by the general formula (2a) and a structure represented by the general formula (2b) are included) can be, as the average number per molecule of polysulfide polymer (A), for instance, 1.1 or greater, 1.3 or greater, 1.5 or greater, 1.8 or greater, 2.0 or greater, or even greater than 2.0. The average number can be, for instance, 15 or less, 10 or less, 7.0 or less, or even 5.0 or less.

Structures represented by the general formulas (2a) and (2b) can be formed by the addition reaction of thiol groups and epoxy groups. The polysulfide polymer (A) containing a structure represented by the general formula (2a) or (2b) can be, for instance, a reaction product of a thiol group-containing polysulfide having a disulfide structure and a thiol group in one molecule, and an epoxy compound having two or more epoxy groups in one molecule; or a modified product thereof.

The weight average molecular weight (Mw) of the thiol group-containing polysulfide as a precursor of the polysulfide polymer (A) is not particularly limited. For instance, it can be 500 or higher, 800 or higher, 1000 or higher, above 1000, or even above 2000. A thiol group-containing polysulfide having a higher Mw tends to lead to formation of a sealant sheet that provides a cured material with greater stretchiness. In some embodiments, the Mw of the thiol group-containing polysulfide can be, for instance, above 2500, above 3000, or even above 3500. The Mw of the thiol group-containing polysulfide can be, for instance, 30000 or lower, or even 10000 or lower. From the standpoint of the ease of handling and reactivity with the epoxy compound, in some embodiments, the Mw of the thiol group-containing polysulfide can be, for instance, below 9000, below 8000, below 7500, below 7000, or even below 6500.

Here, the Mw of the thiol group-containing polysulfide, an epoxy group-containing polysulfide described later, polysulfide polymer (A) or the like can be determined based on polyethylene glycol by gel permeation chromatography (GPC), using tetrahydrofuran (THF) as the mobile phase. Alternatively, a nominal value given in a catalog, literature and the like can be used.

The thiol group-containing polysulfide preferably includes the disulfide structure in the main chain. According to a sealant sheet comprising a polysulfide polymer (A) that is a reaction product (or a modified product thereof) of a thiol group-containing polysulfide with a disulfide structure in the main chain and an epoxy compound having two or more epoxy groups per molecule, the resulting cured material tends to show good stretchiness. The number (as the average number) of disulfide structures in one molecule of the thiol group-containing polysulfide (or the average disulfide group count of the entire thiol group-containing polysulfide used) can be, for instance, 3 or greater, 5 or greater, 10 or greater, 15 or greater, or even 20 or greater. The upper limit of the average disulfide group count is not particularly limited. From the standpoint of the ease of manufacturing the sealant sheet (e.g. the ease of molding into a sheet shape), etc., it can be, for instance, 100 or less, 70 or less, or even 50 or less.

The thiol group-containing polysulfide as a precursor of the polysulfide polymer (A) may include one, two or more thiol groups per molecule of thiol group-containing polysulfide. From the standpoint of readily obtaining a sealant sheet suited for increasing the strength of the cured material and reducing the curing time, a preferable thiol group-containing polysulfide includes more than one thiol group in average per molecule. The average number of thiol groups per molecule of the thiol group-containing polysulfide used (or the average thiol group count) can be, for instance, 1.1 or greater, 1.3 or greater, 1.5 or greater, 1.8 or greater, 2 or greater, or even greater than 2. The upper limit of the average thiol group count is not particularly limited. From the standpoint of the flexibility of the cured material, it can be, for instance, 15 or less, 10 or less, 7 or less, or even 5 or less. A polysulfide having an average of two or more thiol groups can be thought as a thiol compound (C) having two or more thiol groups per molecule.

The thiol group is preferably placed at a terminus of the thiol group-containing polysulfide. By allowing such a thiol group-containing polysulfide to react with an epoxy compound having two or more epoxy groups per molecule, a polysulfide polymer having a terminal epoxy group can be favorably formed. The thiol group-containing polysulfide used may have a thiol group at one terminus of the main chain or at each terminus of the main chain; it may further have another thiol group elsewhere besides the termini of the main chain; or it can be a mixture of these. It is particularly preferable to use a thiol group-containing polysulfide having a thiol group at each terminus of the main chain, that is, a thiol-bi-terminated polysulfide. According to a sealant sheet comprising a polysulfide polymer (A) synthesized using a thiol-bi-terminated polysulfide, the resulting cured material tends to combine well-balanced strength and stretchiness. In some embodiments, of the entire thiol group-containing polysulfide used, the ratio of the thiol-bi-terminated poly-sulfide can be, by weight, for instance, above 50%, above 70%, above 90%, above 95%, above 98%, or even essentially 100%.

The thiol-bi-terminated polysulfide is preferably represented by the next general formula (3):

$$\text{HS—}(R^1\text{—O—}R^2\text{—O—}R^3\text{—S—S})_n\text{—}R^1\text{—O—}\\R^2\text{—O—}R^3\text{—SH} \hspace{2cm} (3)$$

$R^1$, $R^2$ and $R^3$ in the general formula (3) are independently an alkylene group with 1 to 4 carbon atoms, preferably an alkylene group with 1 to 3 carbon atoms, or more preferably an alkylene group with 1 or 2 carbon atoms. In the general formula (3), n can be an integer selected so that the compound of the general formula (3) has a formula weight in a range of, for instance, 500 or higher and 10000 or lower, 800 or higher below 9000, 1000 or higher below 8000, above 1000 and below 8000, or above 2000 and below 7500.

In some embodiments, as the compound represented by the general formula (3), it is preferable to use a thiol group-containing polysulfide wherein $R^1$ is $C_2H_4$, $R^2$ is $CH_2$, and $R^1$ is $C_2H_4$. In this embodiment, n in the general formula (3) can be, for instance, 3 to 70, 5 to 60, 7 to 50, or even 10 to 50.

(Epoxy Group-Containing Polysulfide Polymer (AB))

Among the sealant sheets disclosed herein, the type (I) sealant sheet comprises, as the polysulfide polymer (A), an epoxy group-containing polysulfide polymer (AB) having two or more epoxy groups per molecule; and further comprises a thiol compound (C) having two or more thiol groups per molecule as well as a photobase generator (D). The sealant sheet in such an embodiment may further include or may be free of a polysulfide polymer (A) that is not an epoxy group-containing polysulfide polymer (AB). The sealant sheet in this embodiment may further include or may be free of an epoxy compound (B) that is not an epoxy group-containing polysulfide polymer (AB).

The average number of epoxy groups per molecule of epoxy group-containing polysulfide polymer (AB) (or the average epoxy group count, hereinafter) can be, for instance, about 2 or greater and 20 or less. From the standpoint of the flexibility of the cured material, the average epoxy group count can also be, for instance, 15 or less, 10 or less, 7 or less, or even 5 or less. In some embodiments, the average epoxy group count can be 4 or less, or even 3 or less. The average epoxy group count is typically 2 or greater. From the standpoint of the curing properties and the cured material's strength, it can also be above 2, or even 2.5 or greater. In some embodiments, the average epoxy group count can be, for instance, 3 or greater, or even 4 or greater.

The epoxy groups in the epoxy group-containing poly-sulfide polymer (AB) are preferably located at a terminus of the epoxy group-containing polysulfide polymer (AB). With such an epoxy group-containing polysulfide polymer (AB), the resulting cured material tends to be highly stretchable. The sealant sheet disclosed herein may include an epoxy group-containing polysulfide polymer (AB) that has two or more epoxy groups at one terminus of the main chain; it may include an epoxy group-containing polysulfide polymer (AB) that has one, two or more epoxy groups at each terminus of the main chain; or it may include both of these. The epoxy group-containing polysulfide polymer (AB) hav-ing an epoxy group at one terminus of the main chain may have a non-epoxy functional group at a terminus different from the terminus having the epoxy group. The non-epoxy functional group can be, for instance, a thiol group, amino group, hydroxy group, etc. The sealant sheet disclosed herein preferably includes at least an epoxy group-contain-ing polysulfide polymer (AB) having an epoxy group at each terminus of the main chain. With the inclusion of an epoxy group-containing polysulfide polymer (AB) having such a structure, the resulting cured material tends to combine well-balanced strength and stretchiness. For instance, it is preferable to use an epoxy group-containing polysulfide polymer (AB) having one epoxy group at each terminus of the main chain.

The epoxy group-containing polysulfide polymer (AB) can be obtained by allowing a thiol group-containing poly-sulfide as those described above to react with an epoxy compound having two or more epoxy groups per molecule, with epoxy groups in excess. The epoxy compound can be a bifunctional epoxy compound having two epoxy groups per molecule or a polyfunctional epoxy compound having three or more epoxy groups per molecule. As the epoxy compound, solely one species or a combination of two or more species can be used. From the standpoint of the ease of handling at the reaction with the thiol group-containing polysulfide, etc., in some embodiments, it is preferable to use an epoxy compound that exists as liquid at room temperature.

Examples of the bifunctional epoxy compound include, but are not limited to, bisphenol A epoxy resins, bisphenol F epoxy resins, hydrogenated bisphenol A epoxy resins (i.e. epoxy compounds corresponding to that in structure result-ing from hydrogenation of bisphenol A epoxy resins to convert aromatic rings to cycloalkyl rings), hydrogenated F epoxy resins, biphenyl epoxy resins, aliphatic epoxy resins (e.g. polypropylene glycol-based epoxy resins, etc.), 1,6-hexanediol diglycidyl ether, and polyethylene glycol digly-cidyl ether.

Examples of the polyfunctional epoxy compound include, but are not limited to, novolac-based epoxy resins, glycidyl amine-based epoxy resins, biphenyl-based epoxy resins, triphenylmethane-based epoxy resins, dicyclopentadiene-based epoxy resins, glycerin-based epoxy resins, trimethylol propane-based epoxy resins, N,N,N',N'-tetraglycidyl-m-xy-lenediamine, 1,3-bis(N,N-diglycidylaminomethyl)cyclo-hexane, and polyglycerol polyglycidyl ether. The number of epoxy groups in one molecule of the polyfunctional epoxy compound is at least 3 or greater, can be 4 or greater, or even 5 or greater. The number of epoxy groups in one molecule of the polyfunctional epoxy compound is usually suitably 10 or less, possibly 8 or less, or even 6 or less.

In some embodiments, as the epoxy compound, a bifunctional epoxy compound can be preferably used. The use of the bifunctional epoxy compound can be advantageous in obtaining a sealant sheet that gives a cured material showing suitable stretchiness. As the bifunctional epoxy compound, solely one species or a combination of two or more species can be used.

In some embodiments, as the bifunctional epoxy compound, it is preferable to use an epoxy compound having a five-membered or larger carbon ring structure in the molecule. With a sealant sheet formed using a bifunctional epoxy compound having such a structure, the resulting cured material tends to show high strength and good stretchiness. The five-membered or larger carbon ring structure can be, for instance, a benzene ring, naphthalene ring, cyclohexyl ring, etc. Examples of the epoxy compound including such a carbon ring structure include bisphenol A epoxy resins, bisphenol F epoxy resins, hydrogenated bisphenol A epoxy resins, hydrogenated bisphenol F epoxy resins, and biphenyl epoxy resins. In a preferable embodiment, as the bifunctional epoxy compound, a bisphenol F epoxy resin can be used.

As the epoxy compound, one, two or more species of polyfunctional epoxy compound can be used in combination with a bifunctional epoxy compound or in place of the bifunctional epoxy resin. The use of a polyfunctional epoxy resin may increase the strength of the cured material. The combined use of a bifunctional epoxy compound and a polyfunctional epoxy compound can bring about a sealant sheet that provides a cured material that combines strength and stretchiness at a high level.

In some embodiments, as the polyfunctional epoxy compound, it is possible to use a polyfunctional epoxy compound having an epoxy group-containing repeat unit (i.e. a polyfunctional epoxy polymer) and it is preferable to use, for instance, a novolac-based epoxy resin. Examples of the novolac-based epoxy resin include phenol novolac-based epoxy resins and o-cresol novolac-based epoxy resins. The use of a novolac-based epoxy resin may be advantageous in obtaining a sealant sheet that gives a cured material with high strength and good stretchiness. With the use of a novolac-based epoxy resin having a lower molecular weight, the stretchiness of the cured material tends to increase. For instance, it is preferable to use a phenol novolac-based epoxy resin that exists as liquid at room temperature.

When carrying out the reaction between the thiol group-containing polysulfide and the epoxy compound having two or more epoxy groups in one molecule, any of a suitable catalyst can be used as long as the effect obtainable by the art disclosed herein is not greatly impaired. For instance, a known base catalyst can be suitably selected and used, such as 2,4,6-triaminomethylphenol, triethylamine, and 1,8-diazabicyclo[5.4.0]undeca-7-ene.

When using a basic catalyst, its amount used is not particularly limited and can be selected to suitably obtain the catalytic activity. In some embodiments, relative to 100 parts by weight of the total amount of the thiol group-containing polysulfide and the epoxy compound having two or more epoxy groups per molecule, the amount of basic catalyst used can be, for instance, 1 part by weight or less; it is usually typically 0.5 part by weight or less, possibly 0.2 part by weight or less, 0.1 part by weight or less, or even 0.08 part by weight or less. From the standpoint of enhancing the storage properties of the sealant sheet, it is advantageous to not use the basic catalyst in large excess. From such a standpoint, the amount of basic catalyst used to 100 parts by weight of the total amount can be, for instance, 0.07 part by weight or less, 0.05 part by weight or less, 0.03 part by weight or less, or even 0.02 part by weight or less. The minimum amount of basic catalyst used to 100 parts by weight of the total amount is not particularly limited and it can be, for instance, 0.001 part by weight or greater, or even 0.005 part by weight or greater.

The reaction can proceed by mixing a thiol group-containing polysulfide and an epoxy compound having two or more epoxy groups in one molecule as well as a catalyst used as necessary in a suitable reaction vessel. In some preferable embodiments, a thiol group-containing polysulfide, a bifunctional epoxy compound, a polyfunctional epoxy compound and a catalyst (e.g. a basic catalyst) are mixed in a suitable reaction vessel. There are no particular limitations to the method for supplying the respective materials to the reaction vessel or the order of mixing them, and they can be selected to form a suitable reaction product. The reaction conditions can be suitably selected as long as the effect obtainable by the art disclosed herein is not greatly impaired. In some embodiments, the reaction can be carried out at a reaction temperature of, for instance, 0° C. to 120° C., preferably 5° C. to 120° C., or more preferably 10° C. to 120° C. In view of the ease of controlling the reaction and the reaction efficiency, in some embodiments, the reaction temperature can be, for instance, 20° C. to 100° C., 30° C. to 100° C., 40° C. to 100° C., or even 60° C. to 100° C. The reaction time is not particularly limited and can be selected, for instance, in a range of 10 minutes to 720 hours (preferably 1 hour to 240 hours).

In some embodiments, the reaction is allowed to proceed by carrying out, in the following order, a first heating step performed at a temperature of, for instance, 60° C. to 120° C. (preferably 70° C. to 110° C.); and a second heating step performed at a temperature of 40° C. to 80° C. (preferably 50° C. to 70° C.). By carrying out the heating process in such a stepwise manner, it is possible to inhibit the polysulfide product from obtaining an excessively high elastic modulus and efficiently carry out the step of mixing (e.g. kneading) the reaction product and additives such as filler. The second heating step is preferably performed at a temperature lower than that of the first heating step. The heating time in the first heating step is, for instance, possibly 10 minutes or longer, usually suitably 30 minutes or longer, or also possibly 1 hour or longer. In a preferable embodiment, the heating time in the first heating step can be selected, for instance, from the range of 10 minutes to 24 hours (preferably 30 minutes to 12 hours, more preferably 1 hour to 6 hours). The heating time in the second heating step is, for instance, possibly 3 hours or longer, usually suitably 6 hours or longer, or also possibly 24 hours or longer. In a preferable embodiment, the heating time in the second heating step can be selected, for instance, from the range of 3 hours to 720 hours (preferably 48 hours to 500 hours, more preferably 72 hours to 300 hours). The heating time of the second heating step is preferably longer than that of the first heating step. It is noted that the heating process can be carried out stepwise, divided into three or more steps.

In the synthesis of epoxy group-containing polysulfide polymer (AB) by the reaction described above, the ratio between the thiol group-containing polysulfide and the epoxy compound used can be selected so that the ratio of the total number of epoxy groups in the epoxy compound to the total number of thiol groups in the thiol group-containing polysulfide, i.e., the equivalent ratio of epoxy groups/thiol groups (or the epoxy/thiol ratio, hereinafter), has a value above 1. In some embodiments, the epoxy/thiol ratio value can be, for instance, 1.05 or greater, or even 1.1 or greater. From the standpoint of increasing the strength of the cured material, etc., in some embodiments, the epoxy/thiol ratio value can be, for instance, above 1.2, above 1.4, above 1.5, or even above 1.7. The epoxy/thiol ratio value can be, for instance, below 7.0, below 5.0, below 4.5, or even below 4.0. In some embodiments, from the standpoint of enhancing the stretchiness of the cured material, etc., the epoxy/thiol ratio value can be, for instance, below 3.5, below 3.2, below 3.0, below 2.5, below 2.0, or even below 1.8.

In the synthesis of the epoxy group-containing polysulfide polymer (AB) by the reaction described above, there are no particular limitations to the amount of the epoxy compound having two or more epoxy groups per molecule used. For instance, the epoxy compound can be used in an amount to obtain an aforementioned epoxy/thiol ratio value. In some embodiments, the amount of the epoxy compound used to 100 parts by weight of the thiol group-containing polysulfide is, for instance, possibly 1 part by weight or greater, usually suitably 3 parts by weight or greater, also possibly 5 parts by weight or greater, or even 7 parts by weight or greater. The amount of the epoxy compound used to 100 parts by weight of the thiol group-containing polysulfide is, for instance, possibly 50 parts by weight or less, usually suitably 30 parts by weight or less, also possibly 20 parts by weight or less, or even 15 parts by weight or less.

(Thiol Group-Containing Polysulfide Polymer (AC))

Among the sealant sheets disclosed herein, the type (II) sealant sheet comprises, as the polysulfide polymer (A), a thiol group-containing polysulfide polymer (AC) having two or more thiol groups per molecule and further comprises an epoxy compound (B) having two or more epoxy groups per molecule, and a photobase generator (D). The sealant sheet in such an embodiment may further include or may be free of a polysulfide polymer (A) that is not a thiol group-containing polysulfide polymer (AC). The sealant sheet in this embodiment may further include or may be free of a thiol compound (C) that is not a thiol group-containing polysulfide polymer (AC).

The average thiol group count in the thiol group-containing polysulfide polymer (AC) is typically 2 or greater, or even greater than 2. The upper limit of the average thiol group count is not particularly limited. From the standpoint of the flexibility of the cured material, it is usually suitably 10 or less, possibly 7 or less, 5 or less, 4 or less, 3 or less, 2.8 or less, or even 2.4 or less.

The thiol groups in the thiol group-containing polysulfide polymer (AC) are preferably placed at a terminus of the thiol group-containing polysulfide polymer (AC). With such a thiol group-containing polysulfide polymer (AC), the resulting cured material tends to be highly stretchable. A preferable thiol group-containing polysulfide polymer (AC) has one, two or more thiol groups at each terminus of the main chain. A more preferable thiol group-containing polysulfide polymer (AC) has one thiol group at each terminus of the main chain. With the inclusion of a thiol group-containing polysulfide polymer (AC) having such a structure, the resulting cured material tends to combine well-balanced strength and stretchiness.

As the thiol group-containing polysulfide polymer (AC), it is possible to use, for instance, a species obtainable by allowing an aforementioned epoxy group-containing polysulfide polymer (AB) to react with a thiol compound having two or more thiol groups per molecule, with thiol groups in excess. The thiol compound can be a bifunctional thiol compound having two thiol groups per molecule or a polyfunctional thiol compound having three or more thiol groups per molecule. As the thiol compound, solely one species or a combination of two or more species can be used. From the standpoint of obtaining a sealant sheet that provides a favorably stretchable cured material, a bifunctional thiol compound can be preferably used. For instance, of the thiol compound allowed to react with the epoxy groups in the epoxy group-containing polysulfide polymer (AB), the bifunctional thiol compound can account for 50% by weight or more, 70% by weight or more, or 90% by weight or more. A bifunctional thiol compound can be used solely as the thiol compound.

As the thiol compound allowed to react with the epoxy group-containing polysulfide polymer (AB), for instance, it is possible to use one, two or more species selected among the usable materials for the thiol compound (C) described later. The reaction between the epoxy group-containing polysulfide polymer (AB) and the thiol compound can be allowed to proceed in the same manner as for the reaction between a thiol group-containing polysulfide and an epoxy compound described earlier.

In the synthesis of thiol group-containing polysulfide polymer (AC) by the reaction described above, the ratio between the epoxy group-containing polysulfide and the thiol compound used can be selected so that the ratio of the total number of thiol groups in the thiol compound to the total number of epoxy groups in the epoxy group-containing polysulfide, i.e., the epoxy/thiol ratio, has a value below 1. From the standpoint of increasing the strength of the cured material, etc., in some embodiments, the epoxy/thiol ratio value can be, for instance, 0.95 or less, 0.9 or less, or even 0.85 or less. The epoxy/thiol ratio value is, for instance, possibly 0.1 or greater, or usually suitably 0.2 or greater. In some embodiments, from the standpoint of enhancing the stretchiness of the cured material, etc., the epoxy/thiol ratio value can be, for instance, 0.3 or greater, 0.5 or greater, 0.6 or greater, or even 0.7 or greater.

In the synthesis of the thiol group-containing polysulfide polymer (AC) by the reaction described above, there are no particular limitations to the amount of the thiol compound having two or more thiol groups per molecule used. For instance, the thiol compound can be used in an amount to obtain an aforementioned epoxy/thiol ratio value. In some embodiments, the amount of the thiol compound used to 100 parts by weight of the epoxy group-containing polysulfide is, for instance, possibly 1 part by weight or greater, usually suitably 3 parts by weight or greater, also possibly 5 parts by weight or greater, or even 7 parts by weight or greater. The amount of the thiol compound used to 100 parts by weight of the epoxy group-containing polysulfide is, for instance, possibly 50 parts by weight or less, usually suitably 30 parts by weight or less, also possibly 20 parts by weight or less, or even 15 parts by weight or less.

As the thiol group-containing polysulfide polymer (AC) in the type (II) sealant sheet, for instance, it is also possible to use a thiol group-containing polysulfide (preferably a thiol-bi-terminated polysulfide) described earlier as the material that can be used as a precursor of polysulfide polymer (A).

<Epoxy Compound (B)>

As the epoxy compound (B) in the sealant sheet disclosed herein, a compound having two or more epoxy groups per molecule can be used without particular limitations. For instance, one, two or more species can be used, selected from the group consisting of the various bifunctional epoxy compounds and polyfunctional epoxy compounds exemplified as the materials that can be used for preparing the epoxy group-containing polysulfide polymer (AB).

In view of the balance between the sealant sheet's storability prior to use and curing properties upon use, it is preferable to use a species having an epoxy equivalence in the range of 50 g/eq or higher and 600 g/eq or lower. The epoxy equivalence can be, for instance, 100 g/eq or higher, 120 g/eq or higher, 150 g/eq or higher; and it can be, for instance, 400 g/eq or lower, 300 g/eq or lower, or even 200 g/eq or lower. With increasing epoxy equivalence, the storability prior to use improves while the curing properties upon use tend to degrade. When using two or more species of epoxy compounds (B), the sum of the products of the epoxy equivalences and the weight fractions of the respective epoxy compounds (B) is preferably in these ranges. It is noted that the epoxy equivalence refers to the gram count per equivalence (equivalent weight) of the epoxy group-containing compounds and can be determined based on JIS K7236:2001. Alternatively, nominal values given in a catalog, literature, etc., can be used as well.

The average epoxy group count of the epoxy compound (B) in the sealant sheet can be, for instance, about 2 or greater and 10 or less. From the standpoint of the flexibility of the cured material, the average epoxy group count can be, for instance, 7 or less, 5 or less, 4 or less, or even below 4. In some embodiments, the average epoxy group count can be 3 or less, 2.5 or less, or even 2.2 or less. As the epoxy compound (B), one, two or more species of bifunctional epoxy compounds can be used solely. According to such an embodiment, the resulting sealant sheet is likely to provide a favorably stretchable cured material.

<Thiol Compound (C)>

As the thiol compound (C) in the sealant sheet disclosed herein, a compound having two or more thiol groups per molecule can be used without particular limitations. Examples include, but are not limited to, trimethylolpropane tris(thiopropionate) (or trimethylolpropane tris(3-mercapto-propionate)), pentaerythritol tetrakis(thiopropionate), ethylene glycol bisthioglycolate, 1,4-butanediol bisthioglycolate, trimethylolpropane tris(thioglycolate), pentaerythritol tetrakis(thioglycolate), di(2-mercaptoethyl) ether, 1,4-butanedithiol, 1,5-dimercapto-3-thiapentane, 1,8-dimercapto-3,6-dioxaoctane, 1,3,5-trimercaptomethylbenzene, 4,4'-thiodibenzenethiol, 1,3,5-trimercaptomethyl-2,4,6-trimethylbenzene, 2,4,6-trimercapto-s-triazine, 2-dibutylamino-4,6-dimercapto-s-triazine, pentaerythritol tetrakis(3-mercaptopropionate) and dipentaerythritol hexakis(3-mercaptopropionate).

Examples of commercial thiol compounds (C) include, but are not limited to, JER MATE QX11, QX12, JER CURE QX30, QX40, QX60, QX900, and CAPCURE CP3-800 available from Mitsubishi Chemical Corporation; OTG, EGTG, TMTG, PETG, 3-MPA, TMTP and PETP available from Yodo Kagaku Co., Ltd.; TEMPIC, TMMP, PEMP, PEMP-II-20P and DPMP available from Sakai Chemical Industry Co., Ltd.; and Karenz MT PE1, Karenz MT BD1, Karenz MT NR1, TPMB and TEMB available from Showa Denko K. K. Among these compounds, each can be used alone or a mixture of two or more species can be used as well.

The average thiol group count of the thiol compound (C) in the sealant sheet can be, for instance, about 2 or greater and 10 or less. From the standpoint of the flexibility of the cured material, the average thiol group count can be, for instance, 7 or less, 5 or less, 4 or less, or even below 4. In some embodiments, the average thiol group count can be 3 or less, 2.5 or less, or even 2.2 or less. As the thiol compound (C), one, two or more species of bifunctional thiol compounds can be used solely. According to such an embodiment, the resulting sealant sheet is likely to provide a favorably stretchable cured material.

As the thiol compound (C), it is possible to use a compound having a primary thiol group (or a primary thiol compound), a compound having a secondary thiol group (a secondary thiol compound), or a compound having a tertiary thiol group (a tertiary thiol compound). From the standpoint of the curing properties when the sealant sheet is used, a primary thiol compound can be preferably used. From the standpoint of the storability of the sealant sheet prior to use, a secondary or higher thiol compound (i.e. a secondary thiol compound and/or a tertiary thiol compound) can be preferably used. It is noted that hereinafter, a thiol compound having two primary thiol groups per molecule may be referred to as a primary bifunctional thiol compound and a thiol compound having two secondary thiol groups per molecule may be referred to as a secondary bifunctional thiol compound.

In some embodiments, as the thiol compound (C), a primary thiol compound and a secondary or higher thiol compound (e.g. a secondary thiol compound) can be used together. According to such an embodiment, it is possible to favorably combine storability of the sealant sheet prior to use and curing properties upon its use. The weight ratio of the primary thiol compound in the total weight of the primary and secondary or higher thiol compounds is not particularly limited. It is, for instance, possibly 5% by weight or higher, preferably 15% by weight or higher, more preferably 25% by weight or higher, or also possibly 35% by weight or higher; and it is, for instance, possibly 95% by weight or lower, preferably 75% by weight or lower, also possibly 60% by weight or lower, or even 45% by weight or lower.

As the thiol compound (C), in view of the balance between the sealant sheet's storability prior to use and curing properties upon use, it is preferable to use a species having a thiol equivalence in the range of 45 g/eq or higher and 450 g/eq or lower. The thiol equivalence can be, for instance, 60 g/eq or higher, 70 g/eq or higher, 80 g/eq or higher; and it can be, for instance, 350 g/eq or lower, 250 g/eq or lower, 200 g/eq or lower, or even 150 g/eq or lower. With increasing thiol equivalence, the storability prior to use improves while the curing properties upon use tend to degrade. When using two or more species of thiol compounds (C), the sum of the products of the thiol equivalences and the weight fractions of the respective thiol compounds (C) is preferably in these ranges. It is noted that the thiol equivalence refers to the gram count per equivalence (equivalent weight) of the thiol group-containing compounds and can be determined by iodometry. Alternatively, nominal values given in a catalog, literature, etc., can be used as well.

In either the type (I) or type (II) sealant sheet disclosed herein, there are no particular limitations to the ratio of the epoxy group equivalence to the thiol group equivalence in the sealant sheet, that is, the epoxy/thiol ratio of the sealant sheet. The sealant sheet's epoxy/thiol ratio value can be, for instance, about 0.1 or greater and 10 or less, 0.2 or greater and 5 or less, 0.3 or greater and 3 or less, or even 0.5 or greater and 2 or less. When the epoxy/thiol ratio is at or above an aforementioned lower limit and at or below an aforementioned upper limit, the resulting cured material tends to combine well-balanced strength and stretchiness. In some embodiments, the epoxy/thiol ratio can be, for instance, 0.6 or greater, 0.7 or greater, or 0.8 or greater; and 1.7 or less, 1.5 or less, or 1.2 or less.

In the type (I) sealant sheet, the amount of the thiol compound (C) in the sealant sheet is not particularly limited. The amount of the thiol compound (C) in the sealant sheet can be selected, for instance, to obtain an aforementioned epoxy/thiol ratio. In some embodiments, the amount of the thiol compound (C) relative to 100 parts by weight of the epoxy group-containing polysulfide polymer (AB) can be, for instance, 0.05 part by weight or greater, 0.1 part by weight or greater, 0.3 part by weight or greater, or even 0.5 part by weight or greater; and it can be, for instance, 10 parts by weight or less, 5 parts by weight or less, 3 parts by weight or less, or even 1 part by weight or less.

In the type (II) sealant sheet, the amount of the epoxy compound (B) in the sealant sheet is not particularly limited. The amount of the epoxy compound (B) in the sealant sheet can be selected, for instance, to obtain an aforementioned epoxy/thiol ratio. In some embodiments, the amount of the epoxy compound (B) relative to 100 parts by weight of the thiol group-containing polysulfide polymer (AC) can be, for instance, 0.05 part by weight or greater, 0.1 part by weight or greater, 0.3 part by weight or greater, 0.5 part by weight or greater, or even 1 part by weight or greater; and it can be, for instance, 15 parts by weight or less, 10 parts by weight or less, or even 5 parts by weight or less.

<Photobase Generator (D)>

As the photobase generator (D), a species that generates a base upon photoirradiation is used. Examples of the photobase generator include α-aminoacetophenone compounds; oxime ester compounds; compounds having substituents such as acyloxyimino groups, N-formylated aromatic amino groups, N-acylated aromatic amino groups, nitrobenzyl carbamate groups and alkoxybenzyl carbamate groups; compounds having biguanidic cations. A preferable α-aminoacetophenone in particular has two or more nitrogen atoms. For the photobase generator, solely one species or a combination of two or more species can be used.

As the photobase generator, a commercial product can be used as well. Commercial photobase generators include product names WPBG-018 (9-anthramethyl N,N'-diethyl-carbamate), WPBG-027 ((E)-1-[3-(2-hydroxyphenyl)-2-propenoyl]piperidine), WPBG-082 (guanidium 2-(3-benzoylphenyl)propionate), WPBG-140 (1-(anthraquinon-2-yl) ethyl imidazole carboxylate), WPBG-266 (1,2-diisopropyl-3-[bis(dimethylamino)methylene]guanidium 2-(3-benzoylphenyl)propionate), WPBG-300 (1,2-dicyclohexyl-4,4,5,5-tetramethylbiguanidium n-butyltriphenylborate) and WPBG-345 (1,2-dicyclohexyl-4,4,5,5-tetramethylbiguanidium tetrakis(3-fluorophenyl)borate) available from Wako Pure Chemical Corporation.

Among these, ionic photobase generators having biguanidic cations are preferable for their abilities to effectively accelerate the anion addition reaction between epoxy and thiol groups. Examples of biguanidic cations include alkyl-biguanidinium, cycloalkylbiguanidinium, and cycloalkyl-alkylbiguadinium. In a photobase generator, the anion paired with the biguanidic cation can be, for instance, a borate-based anion. Commercial products of this type of photobase generator include the aforementioned WPBG-300 and WPBG-345. Other examples of the anion paired with the biguanidic cation in the photobase generator include carboxylate-based anions. As a commercial product of this type of photobase generator, the aforementioned WPBG-266 can be preferably used.

The amount of the photobase generator to be used can be selected to obtain desirable effects of its use. In some embodiment, the amount of the photobase generator used can be, for instance, 0.01 part by weight or greater relative to 100 parts by weight of the total amount of the epoxy group-containing polysulfide polymer (AB) and the thiol compound (C) (in case of a type (I) sealant sheet) or of the total amount of the thiol group-containing polysulfide polymer (AC) and the epoxy compound (B) (in case of a type (II) sealant sheet). From the standpoint of enhancing the curing properties of the sealant sheet, it is preferably 0.03 part by weight, possibly 0.07 part by weight or greater, or even 0.1 part by weight or greater. From the standpoint of the raw material costs, etc., the amount of the photobase generator used to 100 parts by weight of the total amount is usually preferably 3 parts by weight or less, more preferably 2 parts by weight or less, possibly 1 part by weight or less, 0.7 part by weight or less, 0.5 part by weight or less, or even 0.3 part by weight or less.

<Photosensitizer>

The sealant sheet disclosed herein may include a sensitizer. The use of the sensitizer can increase the utilization efficiency of the irradiated light and improve the sensitivity of the photobase generator (D). As a photosensitizer, a suitable species can be selected and used among known materials. Non-limiting examples of the photosensitizer include benzophenone and benzophenone derivatives such as 4-methylbenzophenone, 3-benzoylbiphenyl, 4-(4-methylphenylthio)benzophenone, methyl2-benzoyl benzoate, 4-phenylbenzophenone, 4,4'-bis(dimethoxy)benzophenone, 4,4'-bis(dimethylamino)benzophenone, 4,4'-bis(diethylamino)benzophenone, methyl-2-benzoylbenzoate, 2-methylbenzophenone, 3-methylbenzophenone, 3,3'-dimethyl-4-methoxybenzophenone and 2,4,6-trimethylbenzophenone; thioxanthone and thioxanthone derivatives such as 2-Chlorothioxanthone, 4-chlorothioxanthone, 2-isopropylthioxanthone, 4-isopropylthioxanthone, 2,4-dimethylthioxanthone, 2,4-diethylthioxanthone, 1-chloro-4-propoxythioxanthone and 2,4-diethylthioxanthen-9-one; fluorene-based compounds such as 2-hydroxy-9-fluorene; anthrone and anthrone derivatives such as dibenzosuberone and 2-amino-9-fluorene; anthraquinone and anthraquinone derivatives such as 2-ethylanthraquinone, 2-hydroxyanthraquinone and 2-aminoanthraquinone; naphthalene derivatives such as 1-methylnaphthalene, 2-methylnaphthalene, 1-fluoronaphthalene, 1-chloronaphthalene, 2-chloronaphthalene, 1-bromonaphthalene, 2-bromonaphthalene, 1-iodonaphthalene, 2-iodonaphthalene, 1-naphthol, 2-naphthol, 1-methoxynaphthalene, 2-methoxynaphthalene, 1,4-dicyanonaphthalene and methyl3-hydroxy-2-naphthol; anthracene and anthracene derivatives such as 1,2-benzanthracene, 9,10-dichloroanthracene, 9,10-dibromoanthracene, 9,10-diphenyl anthracene, 9-cyanoanthracene, 9,10-dicyanoanthracene and 2,6,9,10-tetracyanoanthracene; nitro compounds such as nitrobenzoate and nitroaniline; and various pigments; but it is not limited to these.

When using a photosensitizer, it can be used in an amount selected to obtain a desirable sensitizing effect. In some embodiments, relative to 100 parts by weight of the total amount of epoxy compound (B) and thiol compound (C), the amount of photosensitizer used can be, for instance, 0.001 part by weight or greater, 0.005 part by weight or greater, 0.01 part by weight or greater, or even 0.05 part by weight or greater. The maximum amount of photosensitizer is not particularly limited. From the standpoint of the storability of the sealant sheet, it is usually suitably 10 parts by weight or less, possibly 5 parts by weight or less, 1 part by weight or less, 0.5 part by weight or less, or even 0.3 part by weight or less.

<Storage Stabilizer>

The sealant sheet disclosed herein may further include an optional compound that is useful in inhibiting the anion addition reaction of thiol and epoxy groups as far as other physical properties are not greatly impaired. The use of such a compound can enhance the storability of the sealant sheet prior to use. Examples of storage stabilizer include organic acids, inorganic acids as well as oligomers, polymers, borates and phosphates having acidic groups in the molecules, with them being liquids or solids at room temperature and possibly having non-acidic functional groups. Examples include, but are not limited to, sulfuric acid, acetic acid, adipic acid, tartaric acid, fumaric acid, barbituric acid, boric acid, pyrogallol, phenol resin and a carboxylic acid anhydride. For the storage stabilizer, solely one species or a combination of two or more species can be used. The amount of storage stabilizer used is not particularly limited and can be selected to obtain desirable effects.

Favorable examples of the storage stabilizer include boric acid esters and phosphoric acid esters.

Boric acid esters are liquids or solids at room temperature. Examples include, but are not limited to, trimethyl borate, triethyl borate, tri-n-propyl borate, triisopropyl borate, tri-n-butyl borate, tripentyl borate, triallyl borate, trihexyl borate, tricyclohexyl borate, trioctyl borate, trinonyl borate, tridecyl borate, tridodecyl borate, trihexadecyl borate, trioctadecyl borate, tris(2-ethylhexyloxy)borane, bis(1,4,7,10-tetraoxaundecyl)(1,4,7,10,13-pentaoxatetradecyl)(1,4,7-trioxaundecyl)borane, tribenzyl borate, triphenyl borate, tri-o-tolyl borate, tri-m-tolyl borate and triethanolamine borate.

Phosphoric acid esters include, but are not limited to, ethyl phosphate, butyl phosphate, propyl phosphate, 2-ethylhexyl phosphate, dibutyl phosphate, di-(2-ethylhexyl) phosphate, oleyl phosphate and ethyl diethyl phosphate.

<Filler>

To the sealant sheet disclosed herein, a filler can be added as necessary. This may improve either one or both between the breaking strength and the elongation at break of the cured material. The filler may be useful in adjusting the storage modulus of the sealant sheet. With the filler suitably used, the shape-holding properties and ease of processing of the sealant sheet may be improved. The filler used is not particularly limited. Any of a suitable filler can be used as long as the effect obtainable by the art disclosed herein is not greatly impaired. As the filler, solely one species or a combination of two or more species can be used.

Examples of the material forming the filler include, but are not limited to, talc, silica, glass, carbon black, alumina, clay, mica, aluminum hydroxide, magnesium hydroxide, calcium carbonate, magnesium carbonate, barium sulfate, titanium dioxide, barium titanate, strontium titanate, calcium titanate, magnesium titanate, bismuth titanate, boron nitride, aluminum borate, barium zirconate and calcium zirconate. Particularly preferable examples include talc, silica, glass and calcium carbonate.

The amount of filler to be included is not particularly limited and can be selected to obtain favorable properties. The filler content can be, for instance, 1% by weight or more of the entire sealant sheet, or also 5% by weight or more. From the standpoint of obtaining greater effect of the use, it can be 10% by weight or more, 15% by weight or more, 20% by weight or more, or even 25% by weight or more. The filler content can be, for instance, below 50% by weight of the entire sealant sheet. From the standpoint of the ease of forming the sheet shape and increasing the stretchiness of the cured material, it is usually suitably below 40% by weight, or possibly even below 35% by weight. In some embodiments, the filler content can be below 30% by weight, or even below 25% by weight.

The mean particle diameter of the filler is not particularly limited. The mean particle diameter is usually suitably 100 μm or less, or preferably 50 μm or less. A smaller mean particle diameter tends to bring a greater effect in improving either or both between the breaking strength and the elongation at break of the cured material. In some embodiments, the filler may have a mean particle diameter of, for instance, 30 μm or less, 20 μm or less, 15 μm or less, 10 μm or less, or even 5 μm or less. The filler's mean particle diameter can be, for instance, 0.1 μm or greater, 0.2 μm or greater, 0.5 μm or greater, or even 1 μm or greater. From the standpoint of the handling properties and dispersibility of the filler, it may be advantageous that the mean particle diameter is not excessively small.

As used herein, the mean particle diameter of the filler refers to the 50th percentile particle diameter by volume (50% median diameter) in a size distribution obtained by laser scattering/diffraction method analysis.

In some embodiments, a filler formed of a material having a refractive index in the range of 1.56 or higher below 1.62 can be used. For instance, a glass filler having a refractive index in this range can be used. The refractive index range is exactly or approximately equal to the refractive index (typically about 1.60) of polysulfide polymer (A). Thus, with a filler having a refractive index in the range, the decrease in transmittance of the sealant sheet due to the filler content tends to be smaller as compared with a filler having a refractive index outside the range. With the sealant sheet having a certain level of transmittance, the sealed area is easily observed through the sealant sheet. This can be advantageous also from the standpoint of the ease of placement, etc., when placing the sealant sheet in a designated area. The sealant sheet disclosed herein may have a transmittance, for instance, above 5%, above 10%, above 15%, or even above 20%. The maximum transmittance is not particularly limited. The transmittance of the sealant sheet disclosed herein can be 100%. From the standpoint of the practicality, it can be 80% or lower, 60% or lower, or even 40% or lower. The sealant sheet disclosed herein can be preferably made in an embodiment where the transmittance is 30% or lower, 20% or lower, or even 15% or lower. The transmittance is determined by the method described later in working examples.

In the sealant sheet disclosed herein, it is possible to use a filler (e.g. glass filler) having a refractive index in the range of 1.56 or higher below 1.62 and a filler (e.g. talc) having a refractive index outside the range together. The ratio of the filler having a refractive index in the range to the total amount of the filler(s) in the sealant sheet is, for instance, possibly 10% by weight or higher, also 25% by weight or higher, preferably 45% by weight or higher, yet also possibly 60% by weight or higher, or 85% by weight or higher; or it can be even 100%. In some embodiments, it is preferable to use a filler formed of a material having a refractive index in the range of 1.56 or higher and 1.61 or lower or in the range of 1.57 or higher and 1.60 or lower. The refractive index can be determined, using generally known techniques such as minimum deviation, critical angle and V-block methods. The measurement can be performed using, for instance, a multi-wavelength Abbe refractometer DR-M4 (available from ATAGO Co., Ltd.). Alternatively, nominal values given in a catalog, literature, etc., can be used as well.

The sealant sheet disclosed herein may include other optional components as long as the effect obtainable by the art disclosed herein is not greatly impaired. Examples of such optional components include, but are not limited to, colorants such as dyes and pigments, dispersing agent, plasticizer, softener, flame retardant, anti-aging agent, UV absorber, antioxidant, and photo-stabilizer.

The sealant sheet disclosed herein may include other polymer or oligomer (or optional polymer, hereinafter) besides those described above, for instance, to increase the tightness of adhesion to the target area to be sealed, etc. From the standpoint of the oil resistance of the cured material, the optional polymer content is preferably 10 parts by weight or less, more preferably 5 parts by weight or less, or yet more preferably 1 part by weight or less, relative to 100 parts by weight of the polysulfide polymer (A). The sealant sheet may be essentially free of such an optional polymer. In this description, being essentially free of a certain component means that the component is not included at least intentionally, unless otherwise noted.

In the sealant sheet disclosed herein, the organic solvent content thereof can be, for instance, 5% by weight or less, 2% by weight or less, 1% by weight or less, or even 0.5% by weight or less; or it can be essentially free of an organic solvent. The organic solvent content can be 0%. The organic solvent refers to a component that is not supposed to react with other components (especially the epoxy group-containing polysulfide or a curing agent possibly used as necessary) in the sealant sheet, such as toluene, cyclohexanone and trichloroethane.

The type (I) sealant sheet may comprise a thiol compound (C) (or a lower thiol compound, hereinafter) having a Mw of 1000 or lower, preferably 600 or lower, or more preferably 400 or lower. Of the total amount of the entire thiol compound (C) and the epoxy group-containing polysulfide polymer (AB), the amount by weight of the lower thiol compound can be, for instance, 0.1% by weight or greater, 0.3% by weight or greater, or even 0.5% by weight or greater. The lower thiol compound may serve to increase the tack of the sealant sheet disclosed herein. When the tack of the sealant sheet is increased, for instance, the sealant sheet placed in a target area to be sealed may show greater temporary fixing properties to the target area. The temporary fixing properties refer to properties that inhibit the sealant sheet from lifting off or shifting in position from the target area to be sealed until the sealant sheet placed in the target area cures. Upon photoirradiation, the lower thiol compound reacts to be incorporated into the cured material. In some embodiments, of the total amount of the entire thiol compound (C) and the epoxy group-containing polysulfide polymer (AB), the amount by weight of the lower thiol compound can be below 0.1% by weight, below 0.05% by weight, or even essentially none. Even in such an embodiment, the sealant sheet disclosed herein has surface tack and can be temporarily fixed to an area to be sealed.

The type (II) sealant sheet may comprise an epoxy compound (B) (or a lower epoxy compound, hereinafter) having a Mw of 1000 or lower, preferably 600 or lower, or more preferably 400 or lower. Of the total amount of the entire epoxy compound (B) and the thiol group-containing polysulfide polymer (AC), the amount by weight of the lower epoxy compound can be, for instance, 0.1% by weight or greater, 0.3% by weight or greater, or even 0.5% by weight or greater. Similar to the lower thiol compound, the lower epoxy compound may serve to increase the tack of the sealant sheet disclosed herein. In some embodiments, of the total amount of the entire epoxy compound (B) and the thiol group-containing polysulfide polymer (AC), the amount by weight of the lower epoxy compound can be below 0.1% by weight, below 0.05% by weight, or even essentially none.

Even in such an embodiment, the sealant sheet disclosed herein may have surface tack and can be temporarily fixed to a target area to be sealed.

<Release Liner>

A release liner can be used during preparation (e.g. sheet formation) of the sealant sheet disclosed herein, storage distribution, shaping, placement in a target area to be sealed, etc. of the sealant sheet prior to use. The release liner is not particularly limited. For instance, it is possible to use a release liner having a release face on the surface of a liner substrate such as resin film, paper and the like; or a release liner formed from a low-adhesive material such as fluoropolymer (tetrafluoroethylene, etc.) and polyolefinic resin (polyethylene, polypropylene, etc.). The release face may be formed, for instance, subjecting the liner substrate to a surface treatment with a release agent such as silicone-based, long-chain alkyl based, fluorine-based release agents and molybdenum sulfide.

<Method for Producing Sealant Sheet>

Described below are embodiments of the sealant sheet production method disclosed herein. It is noted that the following description is for illustration purposes and does not limit the method for producing the sealant sheet disclosed herein. For instance, for the convenience of description, embodiments using fillers are described below; however, the sealant sheet disclosed herein is not to be limited to filler-containing embodiments.

The type (I) sealant sheet comprises an epoxy group-containing polysulfide polymer (AB) and a thiol compound (C) (e.g. an aforementioned lower thiol compound) together. The sealant sheet having such a composition can be produced, for instance, by a method that comprises obtaining an epoxy group-containing polysulfide polymer (AB); adding and mixing a thiol compound (C), a photobase generator (D) and a filler with the epoxy group-containing polysulfide polymer (AB); and molding the resulting mixture into a sheet shape. When the epoxy group-containing polysulfide polymer (AB) is a reaction product of a thiol group-containing polysulfide, a bifunctional epoxy compound and a polyfunctional epoxy compound, the step of obtaining the mixture may include, in the following order, preparing the reaction product of the thiol group-containing polysulfide, the bifunctional epoxy compound and the polyfunctional epoxy compound; and adding and mixing a thiol compound (C), a photobase generator (D) and a filler with the reaction product. Alternatively, the filler can be mixed together when preparing the reaction product.

With respect to the preparation of the reaction product, the description regarding the reaction between the thiol group-containing polysulfide and the epoxy compound having two or more epoxy group in one molecule may apply. Thus, a redundant description is omitted. As for a system that can be used for mixing the reaction product and the additives (the thiol compound (C), photobase generator (D) and filler in the example described above), examples include, but are not limited to, sealed mixing machines or batch mixing machines such as Banbury mixer, kneader, two-roller mill and three-roller mill; and continuous mixing machines such as single screw extruder and two screw extruder.

As the method for molding the mixture into a sheet, a single method or a combination of methods can be employed among known sheet forming methods such as press-molding, calender molding and hot-melt extrusion. The press-molding can be normal pressing or vacuum pressing. From the standpoint of preventing the sheet from trapping air bubbles and inhibiting thermal denaturation of the mixture, in some embodiments, vacuum pressing or calender molding can be preferably applied. The resulting sealant sheet can be subjected to, for instance in a form of the release-lined sealant sheet as shown in FIG. 1 or FIG. 2, storage, processing (e.g. slit processing into a prescribed width, processing a roll into flat sheets, punching out prescribed shapes, etc.), transportation, etc.

The type (II) sealant sheet comprises a thiol group-containing polysulfide polymer (AC) and an epoxy compound (B) (e.g. an aforementioned lower epoxy compound) together. The sealant sheet having such a composition can be produced, for instance, by a method that comprises obtaining a thiol group-containing polysulfide polymer (AC); adding and mixing an epoxy compound (B), a photobase generator (D) and a filler with the thiol group-containing polysulfide polymer (AC); and molding the resulting mixture into a sheet. When the thiol group-containing polysulfide polymer (AC) is a thiol modification product of an epoxy group-containing polysulfide polymer, the step of obtaining the mixture may include, in the following order, preparing the thiol group-containing polysulfide polymer (AC) by allowing thiol groups of a compound having two or more thiol groups per molecule to react with epoxy groups of the epoxy group-containing polysulfide polymer (AB); and adding and mixing an epoxy compound (B), a photobase generator (D) and a filler with the thiol group-containing polysulfide polymer (AC). Alternatively, the filler can be mixed together when preparing the reaction product.

<Applications (Usages)>

There are no particular limitations to the material of the area to be sealed with the sealant sheet disclosed herein. The material can be, for instance, a metal, a resin, a composite material of these, etc. More specific examples include metal and metalloid materials such as iron, iron alloys (carbon steel, stainless steel, chromium steel, nickel steel, etc.), aluminum, aluminum alloys, nickel, tungsten, copper, copper alloys, titanium, titanium alloys and silicon; resin materials such as polyolefin resins, polycarbonate resins, acrylic resins, and acrylonitrile resins (PAN); ceramic materials such as alumina, silica, sapphire, silicon nitride, tantalum nitride, titanium carbide, silicon carbide, gallium nitride, and plaster; glass materials such as aluminosilicate glass, soda lime glass, soda aluminosilicate glass, and quartz glass; and laminates and composites of these. Favorable examples of the metal and metalloid materials include light metals such as aluminum and titanium as well as alloys comprising the light metals as primary components. Examples of an aluminum alloy include duralumin (e g duralumin A2024, duralumin A2017, etc.). Examples of the composites include carbon fiber reinforced plastic (CFRP) and glass fiber reinforced plastic (FRP).

The sealant sheet exists as a non-liquid (i.e. solid) sheet in a temperature range around 25° C.; and therefore, unlike a liquid sealant, it is unnecessary for a worker to control the thickness when placing it in a target area to be sealed. In addition, unlike a liquid sealant, the sealant sheet can be pre-cut to fit a desired external form and placed in the target area to be sealed (typically adhered with the tack of the sealant sheet). Alternatively, the sealant sheet in a roll form can be applied to the target area while unwinding the roll and the remaining sealant sheet can be cut off. The use of the sealant sheet disclosed herein can fundamentally solve problems arising during liquid sealant application such as dripping, uneven application and excess spreading, significantly reducing the working time.

In the sealant sheet disclosed herein, upon photoirradiation, a base is generated from the photobase generator (D) and the anion addition reaction is accelerated between epoxy and thiol groups in the sealant sheet, whereby the sheet undergoes curing. Photoirradiation can be performed, using a suitable known light source, for instance, a chemical lamp, a blacklight (e.g. a blacklight available from Toshiba Lighting & Technology Corporation) and a metal halide lamp. In some embodiments, a light source having a spectral power distribution in the wavelength range from 250 nm to 450 nm can be preferably used. A sensitizer can be included in the sealant sheet to increase the utilization efficiency of the light irradiated by the light source. For instance, when using a light source having a spectral power distribution in the wavelength range from 350 nm to 450 nm, the use of sensitizer is especially effective.

The sealant sheet disclosed herein can be used in an embodiment where photoirradiation is performed with the sheet placed in an area to be sealed. The anion addition reaction between epoxy and thiol groups proceeds slowly as compared with general radical polymerization; and therefore, the sealant sheet disclosed herein will gradually cure. Taking advantage of this, the sealant sheet disclosed herein can also be preferably used in an embodiment where photoirradiation is performed in advance and the sheet is placed without delay (immediately) in the area to be sealed. According to this embodiment, curing can proceed well even when it is a sealant sheet used in a way where uniform irradiation with sufficient light is difficult to achieve after the sheet is placed in the area to be sealed (e.g. a sealant sheet used to seal opaque members together, etc.).

The cured material formed from the sealant sheet disclosed herein or the cured sealant has a tensile strength at break of suitably 0.7 MPa or greater, preferably 0.9 MPa or greater, more preferably greater than 1.0 MPa, possibly 1.1 MPa or greater, or even 1.15 MPa or greater, determined by the method described later in working examples. In some embodiments, the tensile strength at break can be 1.2 MPa or greater, or even 1.3 MPa or greater. The maximum tensile strength at break is not particularly limited. From the standpoint of readily obtaining other physical properties in combination, it can be, for instance, 3 MPa or less.

The cured material formed from the sealant sheet disclosed herein or the cured sealant has an elongation at break of suitably 100%, preferably 120% or greater, possibly 150% or greater, 200% or greater, or even 250% or greater, determined by the method described later in working examples. The maximum elongation at break is not particularly limited. From the standpoint of readily obtaining other physical properties in combination, it can be, for instance, 600% or less, or even 400% or less.

The matters disclosed in this description include the following:

(1) A sealant sheet formed in a sheet shape, the sealant sheet comprising the following components:

an epoxy group-containing polysulfide polymer (AB) having two or more epoxy groups per molecule, a thiol compound (C) having two or more thiol groups per molecule, and a photobase generator (D)

(2) The sealant sheet according to (1) above, wherein the epoxy group-containing polysulfide polymer (AB) is an epoxy-bi-terminated polysulfide.

(3) The sealant sheet according to (1) or (2) above, wherein the thiol compound (C) has a thiol equivalence of 45 g/eq or higher and 450 g/eq or lower.

(4) The sealant sheet according to any of (1) to (3) above, wherein the epoxy group-containing polysulfide polymer (AB) is a reaction product of a thiol-bi-terminated polysulfide having a disulfide structure in its main chain and having a Mw of 500 to 10000, and an epoxy compound having two or more epoxy groups per molecule.

(5) The sealant sheet according to (4) above, wherein the epoxy compound comprises a bifunctional epoxy compound.

(6) The sealant sheet according to (5) above, comprising, as the bifunctional epoxy compound, an epoxy compound having a five-membered or larger carbon ring structure in its molecule.

(7) The sealant sheet according to any of (4) to (6) above, wherein the epoxy compound comprises a trifunctional or higher polyfunctional epoxy compound.

(8) The sealant sheet according to (7) above, comprising a novolac epoxy resin as the polyfunctional epoxy compound.

(9) A sealant sheet formed in a sheet shape, the sealant sheet comprising the following components:

a thiol group-containing polysulfide polymer (AC) having two or more thiol groups per molecule, an epoxy compound (B) having two or more epoxy groups per molecule, and a photobase generator (D)

(10) The sealant sheet according to (9) above, wherein the thiol group-containing polysulfide polymer (AC) is a thiol-bi-terminated polysulfide.

(11) The sealant sheet according to (9) or (10) above, wherein the epoxy compound (B) has an epoxy equivalence of 50 g/eq or higher and 600 g/eq or lower.

(12) The sealant sheet according to any of (1) to (11) above, wherein the photobase generator (D) is an ionic photobase generator having a biguanidic cation.

(13) The sealant sheet according to any of (1) to (12) above, further comprising a sensitizer.

(14) The sealant sheet according to any of (1) to (13) above, further comprising a filler.

(15) The sealant sheet according to (14) above, wherein the filler content is 1% by weight or more and less than 40% by weight of the entire sealant sheet.

(16) The sealant sheet according to (14) or (15), wherein the filler has a mean particle diameter of 0.1 μm or greater and 30 μm or less.

(17) The sealant sheet according to any of (1) to (16) above, having a storage modulus of 0.005 MPa or greater and 0.8 MPa or less at 25° C.

(18) The sealant sheet according to any of (1) to (17) above, having a thickness of 0.01 mm or greater and 10 mm or less.

(19) A release-lined sealant sheet comprising the sealant sheet according to any of (1) to (18) above and a release liner having a release face in contact with at least one face of the sealant sheet.

(20) A method for producing a sealant sheet, the method comprising:

obtaining an epoxy group-containing polysulfide polymer (AB) having two or more epoxy groups per molecule;

adding and mixing a thiol compound (C) having two or more thiol groups per molecule, a photobase generator (D) and a filler with the epoxy group-containing polysulfide polymer (AB); and molding the resulting mixture into a sheet shape.

(21) A method for producing a sealant sheet, the method comprising:

obtaining a thiol group-containing polysulfide polymer (AC) having two or more thiol groups per molecule;

adding and mixing an epoxy compound (B) having two or more epoxy groups per molecule, a photobase generator (D) and a filler with the thiol group-containing polysulfide polymer (AC); and molding the resulting mixture into a sheet shape.

(22) A method for applying a sealing, the method comprising obtaining the sealant sheet according to any of (1) to (18) above, adhering the sealant sheet to an article to be sealed, and allowing the sealant sheet to cure on the article to be sealed to form a cured sealant;

wherein the sealant sheet is subjected to photoirradiation immediately before the sealant sheet is applied to the article to be sealed and/or after the sealant sheet is applied to the article to be sealed.

EXAMPLES

Several working examples related to the present invention are described below, but the present invention is not limited to these examples. In the description below, "parts" are by weight unless otherwise specified.

<Experiment 1>

In Examples 1 to 8 below, were prepared sealant sheets comprising epoxy-bi-terminated polysulfide polymers (AB).

Example 1

Using a reaction vessel equipped with a stirrer, while stirring, were heated the followings at 90° C. for 3 hours: 90 parts of a liquid polysulfide polymer (thiol-bi-terminated polysulfide polymer), 7.5 parts of a bifunctional epoxy compound, 2 parts of a polyfunctional epoxy compound and 0.08 part of a basic catalyst shown in Table 1. By this, was synthesized an epoxy-bi-terminated polysulfide.

The reaction mixture was removed from the vessel and was allowed to cool to room temperature. Subsequently, were added 1 part of a bifunctional thiol compound, 0.5 part of a photobase generator, 0.1 part of a sensitizer, 0.5 part of a storage stabilizer as well as 15 parts of glass filler and 15 parts of talc as the filler shown in Table 1. The resulting mixture was evenly kneaded, using a two-roll mill. Using a vacuum presser, the resulting mixture was shaped into sheets to obtain sealant sheets according to this Example. Here, were prepared two kinds, a 0.2 mm thick sheet and a 1 mm thick sheet.

The sealant sheet according to this Example had an epoxy/thiol ratio value of 1.0. In other words, the number of epoxy groups (unreacted) in the epoxy-bi-terminated polysulfide polymer used for preparing the sealant sheet according to this Example was about the same as the number of thiol groups (unreacted) in the bifunctional thiol compound added to the polymer. The number of epoxy groups in the epoxy-bi-terminated polysulfide polymer is determined by subtracting the thiol group count $N_T$ (calculated from the thiol equivalence and the amount of the liquid polysulfide polymer used) from the epoxy group count $N_E$ (calculated from the epoxy equivalences and the amounts of the respective bifunctional and polyfunctional epoxy compounds).

Examples 2 to 8

Using the materials in the amounts shown in Table 1, but otherwise in the same manner as Example 1, were prepared sealant sheets according to the respective Examples. The sealant sheets according to Examples 2 to 7 had epoxy/thiol ratio values between 0.7 and 1.9. Example 8 was essentially free of thiol groups.

The resulting sealant sheets were subjected to the following measurements and evaluations.

(Determination of Storage Modulus)

From the 1 mm thick sealant sheets, were punched out discs of 8 mm in diameter. Each disc was placed between parallel plates. Using a rheometer (model name ARES G2 available from TA Instruments Japan, Inc.), was determined the storage modulus G' at a measurement temperature of 25° C., at a frequency of 1 Hz, at 0.5% strain. As a result, the sealant sheets according to Examples 1 to 8 all had storage moduli G' falling within the range of 0.005 MPa to 0.8 MPa.

(Determination of Transmittance)

Using a UV-vis spectrophotometer (UV-2550 available from Shimadzu Corporation), each 0.2 mm thick sealant sheets was subjected to spectroscopic analysis and the value at 365 nm wavelength was recorded as the transmittance of the sealant sheet.

(Evaluation of Storability)

Each 0.2 mm thick sealant sheet was placed between two sheets of polyester release liner film with one side having a release face formed of a silicone-based release agent and the resultant was stored in a refrigerator at 5° C. for 14 days. As the release liner, were used DIAFOIL MRF and DIAFOIL MRE available from Mitsubishi Chemical Corporation.

Subsequently, the sealant sheet was removed from the refrigerator and stored in an environment at 23° C. and 50% RH for 30 minutes. The release liner covering one side of the sealant sheet was removed and the exposed surface of the sealant sheet was finger-touched by a tester and inspected sensorily for the presence of remaining surface tack. The results are indicated with the following two levels in the column "Storability" in Table 1.

G: tack left (good storability)

P: tack lost (poor storability)

(Determination of Breaking Strength and Elongation At Break)

Using a blacklight available from Toshiba Lighting & Technology Corporation, each 0.2 mm thick sealant sheet was irradiated with light at 2000 $mJ/cm^2$. The irradiated sealant sheet was stored in an environment at 25° C. for 14 days. The resulting cured material (cured sealant) was then cut into a 10 mm wide, 50 mm long rectangle to prepare a sample piece. It is noted that with respect to the sealant sheet of Example 7, the photoirradiation step was not carried out and the cured material obtained after storage in an environment at 25° C. for 14 days was cut in the same manner to prepare a sample piece.

Each sample piece thus prepared was clamped in the chuck of a tensile tester at a chuck distance of 20 mm. Based on JIS K6767, the sample piece was stretched at a rate of 50 mm/min and the maximum strength observed before the sample piece broke was recorded as the breaking strength. From the chuck distance at break (L1) at which the sample broke and the initial chuck distance (L0) at the start of stretching, the elongation at break was determined by the next equation: Elongation at break (%)=((L1−L0)/L0)×100. The results are shown in Table 1.

The sealant sheet according to Example 8 did not cure under the conditions described above; and therefore, it was not subjected to measurement of strength at break or elongation at break, or to the following oil resistance test, either.

(Oil Resistance Test)

Each 0.2 mm sealant sheet was cut into a 25 mm wide, 100 mm long rectangle to prepare a sealant sheet piece for an oil resistance test. Each sealant sheet piece was placed at around the center of a rectangular stainless steel plate (SUS304BA plate) measuring about 50 mm in width and about 150 mm in length and was press-bonded with a hand-held roller moved back and forth once. After the backside (opposite from the stainless steel plate side) of the sealant sheet piece thus adhered to the stainless steel plate was irradiated with light at 2000 $mJ/cm^2$ using the blacklight and stored in an environment at 25° C. for 14 days (for Example 7, after stored in the environment at 25° C. for 14 days without the photoirradiation step), the resulting cured material was immersed along with the stainless plate in hydraulic oil (product name SKYDROL, phosphate ester-based hydraulic oil available from Solutia) or in jet fuel (product name JET A-1 available from EMG Marketing G. K.) and left at room temperature for two weeks. As a result, the cured materials formed from the sealant sheets of Examples 1 to 7 all showed good oil resistance. In particular, the cured materials did not peel off the stainless steel plates in either hydraulic oil-immersed samples or jet fuel-immersed samples and no significant infiltration of the hydraulic oil or jet fuel was observed at the interfaces of the cured materials and the stainless steel plates.

TABLE 1

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Liquid polysulfide polymer [1)] (pts) | 90 | 90 | 90 | 90 | 90 | 90 | 90 | 90 |
| Bifunctional epoxy compound [2)] (pts) | 7.5 | 10 | 10 | 6.3 | 7.5 | 7.5 | 7.5 | 10 |
| Polyfunctional epoxy compound [3)] (pts) | 2 | 2 | 2 | 2 | 2 | 2 | 2 | 2 |
| Basic catalyst [6)] (pts) | 0.08 | 0.08 | 0.08 | 0.08 | 0.08 | 0.08 | 0.08 | 0.08 |
| Bifunctional thiol compound [4)] (pts) | 1 | 2.45 | — | 0.6 | 0.75 | 0.5 | 1 | — |
| Tetrafunctional thiol compound [5)] (pts) | — | — | 3.7 | — | — | — | — | — |
| Photobase generator [7)] (pts) | 0.5 | 0.5 | 0.5 | 0.5 | 0.5 | 0.5 | — | 0.5 |
| Imidazole-based curing agent [8)] (pts) | — | — | — | — | — | — | 1 | — |
| Sensitizer [9)] (pts) | 0.1 | 0.1 | 0.1 | 0.1 | 0.1 | 0.1 | — | 0.1 |
| Storage stabilizer [10)] (pts) | 0.5 | 0.5 | 0.5 | 0.5 | 0.5 | 0.5 | 0.5 | 0.5 |
| nD = 1.57 Glass filler [11)] (pts) | 15 | 15 | 15 | 15 | 15 | 15 | 15 | 15 |
| Talc [13)] (pts) | 15 | 15 | 15 | 15 | 15 | 15 | 15 | 15 |
| Tensile strength at break (Mpa) | 1.55 | 1.37 | 1.23 | 1.33 | 1.32 | 1.19 | 1.60 | n.m.[14)] |
| Elongation at break (%) | 350 | 266 | 110 | 280 | 280 | 250 | 320 | n.m.[14)] |

TABLE 1-continued

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Storability | G | G | G | G | G | G | P | G |
| Transmittance (365 nm) (%) | 20 | 21 | 20 | 20 | 20 | 20 | 19 | 20 |

[1] Toray Fine Chemicals, thiol-bi-terminated polysulfide, THIOKOL ™ LP-55, Mw 4000, thiol equivalence 2000 g/eq
[2] Mitsubishi Chemical, bisphenol F epoxy resin, jER ™ 806, epoxy equivalence 169 g/eq
[3] Mitsubishi Chemical, phenol novolac epoxy resin, jER ™ 152, epoxy equivalence 177 g/eq
[4] Tokyo Chemical Industry, 3,6-dioxa-1,8-octainediol, thiol equivalence 91 g/eq
[5] Showa Denko K.K., pentaerythritol tetrakis(3-mercaptobutylate), Karenz ™ MT PE1, thiol equivalence 136 g/eq
[6] Tokyo Chemical Industry, 2,4,6-triaminomethyl-phenol
[7] FUJIFILM Wako Pure Chemical, biguanidic photobase generator, product name WPBG-300
[8] Mitsubishi Chemical, 1-isobutyl-2-methylimidazole, product name IBMI12
[9] Tokyo Chemical Industry, 2-ethylanthraquinone
[10] Shikoku Chemicals, boric acid ester compound, Cureduct ™ L-07N
[11] Nippon Frit Co., Ltd., product name CF0033-05C, mean particle diameter 7 μm
[13] Nippon Talc Co., Ltd., MICRO ACE ™ SG-95, nD = 1.55, mean particle diameter 2.5 μm
[14] not measured due to no curing The sealant sheets according to this Examples 1 to 8 all had flexible sheet shapes with surface tack and were able to stably maintain the sheet shapes. By the operation as easy as applying these sealant sheets, SUS304BA plates were adequately covered each with a 0.2 mm thick sealant layer. The sealant sheets of Examples 1 to 6 using photobase generators showed good storability and cured upon photoirradiation to form cured materials showing practical strength at break and elongation at break. It is noted that when a sealant sheet was prepared in the same manner as Example 1 except that the sensitizer was not used and subjected to measurements and evaluations in the same manner as Example 1 except that it was irradiated with UV-C at 2000 mJ/cm$^2$ using a UV-C UV radiation system UVDI-360 available from Moraine Corporation in place of the black-light, the sealant sheet was found to have properties comparable to Example 1. The sealant sheet not using the sensitizer showed good storability before the photoirradiation.

<Experiment 2>

In the following Examples 9 to 12, were prepared sealant sheets comprising thiol-bi-terminated polysulfide polymers (AC).

Example 9

Using a reaction vessel equipped with a stirrer, while stirring, were heated the followings at 90° C. for 3 hours: 90 parts of a liquid polysulfide polymer (thiol-bi-terminated polysulfide polymer), 10 parts of a bifunctional epoxy compound, 2 parts of a polyfunctional epoxy compound and 0.08 part of a basic catalyst shown in Table 2. Subsequently, was added 4 parts of a bifunctional thiol compound shown in Table 2. The resultant was heated at 90° C. for 1.5 hours. By this, was synthesized a thiol-bi-terminated polysulfide.

The reaction mixture was removed from the vessel and was allowed to cool to room temperature. Subsequently, were added 3 parts of a bifunctional epoxy compound, 0.5 part of a photobase generator, 0.1 part of a sensitizer, 0.5 part of a storage stabilizer as well as 15 parts of glass filler and 15 parts of talc as the filler shown in Table 2. The resulting mixture was evenly kneaded, using a two-roll mill. Using a vacuum presser, the resulting mixture was shaped into sheets to obtain sealant sheets according to this Example. Here, were prepared two kinds, a 0.2 mm thick sheet and a 1 mm thick sheet.

Examples 10 to 12

Using the materials in the amounts shown in Table 2, but otherwise in the same manner as Example 9, were prepared sealant sheets according to the respective Examples. The sealant sheets according to Examples 9 to 12 all had an epoxy/thiol ratio value of 1.0.

The resulting sealant sheets were subjected to the same measurements and evaluations as Experiment 1. As a result, the sealant sheets according to Examples 9 to 12 all had storage moduli G' in the range between 0.005 MPa and 0.8 MPa. All showed good oil resistance as well. The results of the other measurements and evaluations are as shown in Table 2.

TABLE 2

|  | Ex. 9 | Ex. 10 | Ex. 11 | Ex. 12 |
|---|---|---|---|---|
| Liquid polysulfide polymer [1] (pts) | 90 | 90 | 90 | 90 |
| Bifunctional epoxy compound [2] (pts) | 10 | 10 | 10 | 10 |
| Polyfunctional epoxy compound [3] (pts) | 2 | 2 | 2 | 2 |
| Basic catalyst [6] (pts) | 0.08 | 0.08 | 0.08 | 0.08 |
| Bifunctional thiol compound [4] (pts) | 4 | 4 | 4 | 4 |
| Bifunctional epoxy compound [2] (pts) | 3 | 3 | 3 | 3 |
| Photobase generator [7] (pts) | 0.5 | 0.5 | 0.5 | 0.5 |
| Sensitizer [9] (pts) | 0.1 | 0.1 | 0.1 | 0.1 |
| Storage stabilizer [10] (pts) | 0.5 | 0.5 | 0.5 | 0.5 |
| nD = 1.57 Glass filler [11] (pts) | 15 | 30 | — | — |
| nD = 1.60 Glass filler [12] (pts) | — | — | 30 | — |
| Talc [13] (pts) | 15 | — | — | 15 |
| Tensile strength at break (Mpa) | 1.28 | 0.94 | 0.84 | 1.18 |
| Elongation at break (%) | 265 | 270 | 250 | 290 |
| Storability | G | G | G | G |
| Transmittance (365 nm) (%) | 20 | 28 | 27 | 35 |

[1] Toray Fine Chemicals, thiol-bi-terminated polysulfide, THIOKOL ™ LP-55, Mw 4000, thiol equivalence 2000 g/eq
[2] Mitsubishi Chemical, bisphenol F epoxy resin, jER ™ 806, epoxy equivalence 169 g/eq
[3] Mitsubishi Chemical, phenol novolac epoxy resin, jER ™ 152, epoxy equivalence 177 g/eq
[4] Tokyo Chemical Industry, 3,6-dioxa-1,8-octainediol, thiol equivalence 91 g/eq
[6] Tokyo Chemical Industry, 2,4,6-triaminomethyl-phenol
[7] FUJIFILM Wako Pure Chemical, biguanidic photobase generator, product name WPBG-300
[9] Tokyo Chemical Industry, 2-ethylanthraquinone
[10] Shikoku Chemicals, boric acid ester compound, Cureduct ™ L-07N
[11] Nippon Frit Co., Ltd., product name CF0033-05C, mean particle diameter 7 μm
[12] Nippon Frit Co., Ltd., product name CF0060-05C, mean particle diameter 7 μm
[13] Nippon Talc Co., Ltd., MICRO ACE ™ SG-95, nD = 1.55, mean particle diameter 2.5 μm The sealant sheets according to Examples 9 to 12 all had flexible sheet shapes with surface tack and were able to stably maintain the sheet shapes. By such easy application of sealant sheets, the SUS304BA plates were properly covered with 0.2 mm thick sealant layers. The sealant sheets in this Experiment showed good storability and cured upon photoirradiation to form cured materials showing practical strength at break and elongation at break. It is noted that when a sealant sheet was prepared in the same manner as Example 9 except that the filler was not used, the sealant sheet was found to show good storability and transparency.

<Experiment 3>

In the following Examples 13 to 17, were prepared sealant sheets comprising epoxy-bi-terminated polysulfide polymers (AB).

Example 13

Using a reaction vessel equipped with a stirrer, while stirring, were heated the followings at 90° C. for 3 hours: 90 parts of a liquid polysulfide polymer (thiol-bi-terminated polysulfide polymer), 6.7 parts of a bifunctional epoxy compound, 2 parts of a polyfunctional epoxy compound and 0.01 part of a basic catalyst shown in Table 3. Subsequently, the reaction mixture was removed from the vessel, transferred to another vessel and stored in an environment at 50° C. for 168 hours. By this, was synthesized an epoxy-bi-terminated polysulfide.

The reaction mixture was removed from the vessel and was allowed to cool to room temperature. Subsequently, were added 0.6 part of a primary bifunctional thiol compound, 0.5 part of a photobase generator, 0.5 part of a storage stabilizer as well as 30 parts of talc as the filler shown in Table 3. The resulting mixture was evenly kneaded, using a two-roll mill. Using a vacuum presser, the resulting mixture was shaped into sheets to obtain sealant sheets according to this Example. Here, were prepared two kinds, a 0.2 mm thick sheet and a 1 mm thick sheet.

Examples 14 to 17

Using the materials in the amounts shown in Table 3, but otherwise in the same manner as Example 13, were prepared sealant sheets according to the respective Examples.

It is noted that the sealant sheets according to Examples 13 to 17 all had an epoxy/thiol ratio value of 1.0.

The resulting sealant sheets were subjected to the same measurements and evaluations as Experiment 1. It is noted, however, that in the storability evaluation, the storage time in the refrigerator at 5° C. was changed to 60 days; at 14, 30 and 60 days from the start of storage, after the sealant sheet was removed from the refrigerator and stored in an environment at 23° C. and 50% RH, the presence of remaining tack was sensorily assessed in the same manner as Experiment 1. In the test results shown in the column "Storability" in Table 3, "GG" indicates that the tack was still present when assessed after 30 days and "GGG" indicates that the tack was sun present when assessed after 60 days. The sealant sheets according to Examples 13 to 17 all had storage moduli G' in the range between 0.005 MPa and 0.8 MPa. All showed good oil resistance as well. The results of the other measurements and evaluations are as shown in Table 3.

TABLE 3

| | Ex. 13 | Ex. 14 | Ex. 15 | Ex. 16 | Ex. 17 |
|---|---|---|---|---|---|
| Liquid polysulfide polymer [1] (pts) | 90 | 90 | 90 | 90 | 90 |
| Bifunctional epoxy compound [2] (pts) | 6.7 | 6.7 | 6.7 | 6.7 | 6.7 |
| Polyfunctional epoxy compound [3] (pts) | 2 | 2 | 2 | 2 | 2 |
| Basic catalyst [6] (pts) | 0.01 | 0.01 | 0.01 | 0.01 | 0.01 |
| Primary bifunctional thiol compound [4] (pts) | 0.6 | 0.45 | 0.3 | 0.3 | 0.3 |

TABLE 3-continued

| | Ex. 13 | Ex. 14 | Ex. 15 | Ex. 16 | Ex. 17 |
|---|---|---|---|---|---|
| Secondary bifunctional thiol compound [15] (pts) | — | 0.25 | 0.5 | 0.5 | 0.5 |
| Photobase generator WPBG-300 [7] (pts) | — | — | — | — | 0.5 |
| Photobase generator WPBG-266 [16] (pts) | 0.5 | 0.5 | 0.5 | 0.2 | — |
| Sensitizer [9] (pts) | — | — | — | — | 0.1 |
| Storage stabilizer [10] (pts) | 0.5 | 0.5 | 0.5 | 0.5 | 0.5 |
| Talc [13] (pts) | 30 | 30 | 30 | 30 | 30 |
| Tensile strength at break (Mpa) | 1.22 | 1.23 | 1.25 | 1.18 | 1.18 |
| Elongation at break (%) | 240 | 245 | 210 | 200 | 160 |
| Storability | GG | GG | GGG | GGG | GGG |
| Transmittance (365 nm) (%) | 12 | 12 | 12 | 12 | 12 |

[1] Toray Fine Chemicals, thiol-bi-terminated polysulfide, THIOKOL ™ LP-55, Mw 4000, thiol equivalence 2000 g/eq
[2] Mitsubishi Chemical, bisphenol F epoxy resin, jER ™ 806, epoxy equivalence 169 g/eq
[3] Mitsubishi Chemical, phenol novolac epoxy resin, jER ™ 152, epoxy equivalence 177 g/eq
[4] Tokyo Chemical Industry,3,6-dioxa-1,8-octainediol, thiol equivalence 91 g/eq
[6] Tokyo Chemical Industry, 2,4,6-triaminomethyl-phenol
[7] FUJIFILM Wako Pure Chemical, biguanidic photobase generator, product name WPBG-300
[9] Tokyo Chemical Industry, 2-ethylanthraquinone
[10] Shikoku Chemicals, boric acid ester compound, Cureduct ™ L-07N
[13] Nippon Talc Co., Ltd., MICRO ACE ™ SG-95, nD = 1.55, mean particle diameter 2.5 µm
[15] Showa Denko, 1,4-bis(3-mercaptobutyloxy)butane, Karenz ™ MT BD1, thiol equivalence 147.2 g/eq
[16] FUJIFILM Wako Pure Chemical, biguanidic photobase generator, product name WPBG-266

The sealant sheets according to Examples 13 to 17 all had flexible sheet shapes with surface tack and were able to stably maintain the sheet shapes. By such easy application of sealant sheets, the SUS304BA plates were properly covered with 0.2 mm thick sealant layers. The sealant sheets in this Experiment showed good storability and cured upon photoirradiation to form cured materials showing practical strength at break and elongation at break.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST

21 sealant sheet
21A first face
21B second face
31, 32 release liners
100, 200 release-lined sealant sheets

The invention claimed is:

1. A sealant sheet formed in a sheet shape, the sealant sheet comprising the following components:

an epoxy group-containing polysulfide polymer (AB) having two or more epoxy groups per molecule, a thiol compound (C) having two or more thiol groups per molecule, and a photobase generator (D), and wherein the epoxy group-containing polysulfide polymer (AB) is a reaction product of a thiol group-containing polysulfide having a disulfide structure and a thiol group in one molecule and an epoxy compound, the epoxy compound comprising a bifunctional epoxy compound having two epoxy groups in one molecule, and a polyfunctional epoxy compound having three or
more epoxy groups in one molecule,
wherein an epoxy/thiol ratio of the sealant sheet is 0.1 or
greater and 1.0 or less, and
wherein the sealant sheet has a sheet shape before being
placed in an area to be sealed with the sealant sheet, and
is a semi-cured sealant sheet capable of being further
cured.

2. The sealant sheet according to claim 1, wherein the
thiol compound (C) has a thiol equivalence of 45 g/eq or
higher and 450 g/eq or lower.

3. The sealant sheet according to claim 1, wherein the
photobase generator (D) is an ionic photobase generator
having a biguanidic cation.

4. The sealant sheet according to claim 1, further com-
prising a filler.

5. The sealant sheet according to claim 1, having a storage
modulus of 0.005 MPa or greater and 0.8 MPa or less at 25°
C.

6. A release-lined sealant sheet comprising
the sealant sheet according to claim 1, and
a release liner having a release face in contact with at least
one face of the sealant sheet.

7. The sealant sheet according to claim 1, wherein the
sealant sheet is a solid sealant sheet.

8. The sealant sheet according to claim 1, having a storage
modulus of 0.05 MPa or greater and 0.8 MPa or less at 25°
C.

\* \* \* \* \*